(12) United States Patent
Li et al.

(10) Patent No.: US 11,974,271 B2
(45) Date of Patent: Apr. 30, 2024

(54) UPLINK TRANSMISSION TECHNIQUES USING PRECONFIGURED RESOURCES IN WIRELESS COMMUNICATIONS

(71) Applicant: Qualcomm Incorporated, San Diego, CA (US)

(72) Inventors: Qiaoyu Li, Beijing (CN); Chao Wei, Beijing (CN); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 17/283,621

(22) PCT Filed: Nov. 9, 2018

(86) PCT No.: PCT/CN2018/114891
§ 371 (c)(1),
(2) Date: Apr. 8, 2021

(87) PCT Pub. No.: WO2020/093392
PCT Pub. Date: May 14, 2020

(65) Prior Publication Data
US 2021/0352691 A1    Nov. 11, 2021

(51) Int. Cl.
*H04W 72/1268*    (2023.01)
*H04L 5/00*    (2006.01)
(Continued)

(52) U.S. Cl.
CPC ....... *H04W 72/1268* (2013.01); *H04L 5/0051* (2013.01); *H04W 12/08* (2013.01);
(Continued)

(58) Field of Classification Search
CPC . H04W 12/08; H04W 48/06; H04W 72/1268; H04W 72/0446; H04W 72/0453; H04W 72/21; H04L 5/0051
See application file for complete search history.

(56) References Cited

U.S. PATENT DOCUMENTS 9,253,692 B1    2/2016 Shah et al.
10,660,127 B2 *  5/2020 Yang ................. H04W 74/0808
(Continued)

FOREIGN PATENT DOCUMENTS

| CN | 102238531 A | 11/2011 |
|---|---|---|
| WO | WO-2018201670 A1 | 11/2018 |
| WO | WO-2018202748 A1 | 11/2018 |

OTHER PUBLICATIONS

International Search Report and Written Opinion—PCT/CN2018/114891—ISA/EPO—dated Aug. 8, 2019.
(Continued)

*Primary Examiner* — Raj Jain
(74) *Attorney, Agent, or Firm* — Holland & Hart LLP

(57) ABSTRACT

Methods, systems, and devices for wireless communications are described for configuring contention-free uplink resources and contention-based uplink resources as preconfigured uplink resources (PUR) available for a user equipment (UE) to transmit one or more uplink transmissions without a specific allocation for the uplink transmission from a base station. Each of two or more UEs may be configured with separate portions of contention-free PUR that each UE may use to transmit a relatively small first uplink communication that provides an indication that the
(Continued)

UE will transmit a relatively larger second uplink communication using contention-based PUR. The UE may transmit a buffer status report (BSR) using the contention-free PUR. The first communication may provide an indication of one or more physical layer parameters associated with the second uplink communication. The UE may transmit the second uplink communication using the indicated one or more physical layer parameters via the contention-based uplink resource.

35 Claims, 18 Drawing Sheets

(51) Int. Cl.
    *H04W 12/08*     (2021.01)
    *H04W 72/0446*     (2023.01)
    *H04W 72/0453*     (2023.01)
    *H04W 72/21*     (2023.01)
    *H04W 74/02*     (2009.01)

(52) U.S. Cl.
    CPC ... *H04W 72/0446* (2013.01); *H04W 72/0453* (2013.01); *H04W 72/21* (2023.01); *H04W 74/02* (2013.01)

(56) References Cited

U.S. PATENT DOCUMENTS

| | | | |
|---|---|---|---|
| 2011/0128928 | A1 | 6/2011 | Lin et al. |
| 2015/0195854 | A1 | 7/2015 | Zhu et al. |
| 2016/0143064 | A1 | 5/2016 | Cho et al. |
| 2018/0084430 | A1 | 3/2018 | Patel et al. |
| 2018/0206288 | A1* | 7/2018 | Pelletier ............... H04W 76/27 |
| 2022/0038997 | A1* | 2/2022 | Höglund ............... H04W 48/06 |

OTHER PUBLICATIONS

Mediatek Inc: "Early Transmission in Preconfigured UL Resources in NB-IoT", 3GPP TSG-RAN WG2 Meeting #104, 3GPP Draft, R2-1816957 Early Transmission in Preconfigured UL Resources in NB-IoT, 3rd Generation Partnership Project (3GPP), Mobile Competence Centre, 650, Route Des Lucioles, F-06921 Sophia-Antipolis Cedex, France, vol. RAN WG2, No. Spokane, WA, USA, Nov. 12, 2018-Nov. 16, 2018, Nov. 2, 2018 (Nov. 2, 2018), 4 Pages, XP051480896, Retrieved from the Internet: URL: http://www.3gpp.org/ftp/tsg%5Fran/WG2%5FRL2/TSGR2%5F104/Docs/R2%2D1816957%2Ezip [retrieved on Nov. 2, 2018], section 2, p. 2-p. 3.

Qualcomm Incorporated: "Support for Transmission in Preconfigured UL Resources", 3GPP TSG RAN WG1 Meeting #95, 3GPP Draft, R1-1813047, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), pp. 1-7, XP051479313, Retrieved from the Internet: URL: https://www.3gpp.org/ftp/TSG_RAN/WG1_RL1/TSGR1_95/Docs/R1-1813047.zip, [retrieved on Nov. 3, 2018], last 2 agreements, p. 1, 2nd agreement, p. 2, section 2, p. 2-p. 4, table 1, section 5, p. 5.

Sierra Wireless: "NB-IoT Pre-configured UL Resources Design Considerations", 3GPP TSG RAN WG1 Meeting #95, 3GPP Draft, R1-1812726 NB PUR F, 3rd Generation Partnership Project (3GPP), Mobile Competence Centre, 650, Route Des Lucioles, F-06921 Sophia-Antipolis Cedex, France, vol. RAN WG1, No. Spokane, WA, USA, Nov. 12, 2018-Nov. 16, 2018, Nov. 3, 2018, (Nov. 3, 2018), 11 Pages, XP051478969, Retrieved from the Internet: URL: https://www.3gpp.org/ftp/TSG_RAN/WG1_RL1/TSGR1_95/Docs/R1-1812726.zip [retrieved on Nov. 3, 2018], section 5, p. 8, section 6, p. 8.

Supplementary European Search Report—EP18939252—Search Authority—The Hauge—dated May 25, 2022.

* cited by examiner

UPLINK TRANSMISSION TECHNIQUES USING PRECONFIGURED RESOURCES IN WIRELESS COMMUNICATIONS

CROSS REFERENCE TO RELATED APPLICATIONS

The present Application is a 371 national phase filing of International Patent Application No. PCT/CN2018/114891 by Li et al., entitled "UPLINK TRANSMISSION TECHNIQUES USING PRECONFIGURED RESOURCES IN WIRELESS COMMUNICATIONS," filed Nov. 9, 2018, assigned to the assignee hereof, which is hereby incorporated by reference in its entirety.

The following relates generally to wireless communications, and more specifically to uplink transmission techniques using preconfigured resources in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some systems, UEs may have relatively frequent transmissions of a relatively small amount of data. For example, a UE may have an associated sensor (e.g., in a vehicle or piece of equipment) and may report one or more sensor measurements on a recurring basis. Further, in some systems, a UE may request uplink resources from a base station for uplink data transmissions, and the base station may provide allocated resources to the UE responsive to such a request for uplink resources. In cases where the UE may have relatively frequent transmissions of data, such requests for and allocations of uplink data resources may consume a relatively large amount of overhead compared to an amount of data to be transmitted in each instance. Additionally or alternatively, a UE may need to transmit data that has relatively strict latency requirements, and relatively large signaling overhead may consume valuable latency budget in such cases. Accordingly, techniques for reducing signaling overhead in such cases may be desirable in order to enhance the efficiency and reliability of such wireless networks.

SUMMARY

The described techniques relate to improved methods, systems, devices, and apparatuses that support uplink transmission techniques using preconfigured resources in wireless communications. According to various aspects of the disclosure, techniques are provided for configuring contention-free uplink resources and contention-based uplink resources as preconfigured uplink resources (PUR) available for a user equipment (UE) to transmit one or more uplink transmissions without a specific allocation for the uplink transmission being provided by a base station. In some cases, each of two or more UEs may be configured with separate portions of contention-free PUR that each UE may use to transmit a relatively small first uplink communication. In addition, when the UE has additional data that cannot be finished by only using the small-volume contention-free PUR, additional indications can be supplied in the contention-free PUR (e.g., a buffer status report (BSR) that indicates the UE has a non-zero data buffer) that provides an indication that the UE will transmit a relatively larger second uplink communication using contention-based PUR. Further, in some cases, the first communication may provide an indication of one or more physical layer parameters associated with the second uplink communication. The UE may transmit the second uplink communication using the indicated one or more physical layer parameters via the contention-based uplink resource.

A base station may receive the first uplink communication and use the indicated physical layer parameter(s) to receive the second uplink communication. In some cases, the base station may use an identifier (e.g., a radio network temporary identifier (RNTI)) to decode two or more uplink communications in the contention-based PUR resources. In cases where the base station detects that two or more UEs are using same contention-based PUR resources or a same demodulation reference signal (DMRS) sequence for associated second uplink communications, the base station may transmit an early termination indication to one or more of the UEs. In some cases, the UE may monitor for a downlink transmission from the base station while transmitting the second uplink communication, and may discontinue the second uplink communication in the event that an early termination indication is detected. In some cases, the base station may continue to receive a second uplink communication from one of the UEs following the early termination of one or more other UEs.

A method of wireless communication is described. The method may include establishing, at a UE, a first connection with a base station, transmitting, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication, and transmitting the second uplink communication using the indicated one or more physical layer parameters via the contention-based uplink resource.

An apparatus for wireless communication is described. The apparatus may include a processor, memory in electronic communication with the processor, and instructions stored in the memory. The instructions may be executable by the processor to cause the apparatus to establish, at a UE, a first connection with a base station, transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication, and transmit the second uplink communication using the indicated one or more physical layer parameters via the contention-based uplink resource.

Another apparatus for wireless communication is described. The apparatus may include means for establishing, at a UE, a first connection with a base station, transmitting, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication, and transmitting the second uplink communication using the indicated one or more physical layer parameters via the contention-based uplink resource.

A non-transitory computer-readable medium storing code for wireless communication is described. The code may include instructions executable by a processor to establish, at a UE, a first connection with a base station, transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication, and transmit the second uplink communication using the indicated one or more physical layer parameters via the contention-based uplink resource.

In some examples of the method, apparatuses, and non-transitory computer-readable medium described herein, the indication that the UE will transmit the second uplink communication may include a buffer status report (BSR) that indicates an amount of data to be transmitted by the UE, and where at least a portion of the data to be transmitted by the UE may be included in the second uplink communication. In some examples of the method, apparatuses, and non-transitory computer-readable medium described herein, the BSR indicates that the UE is to transmit the second uplink communication based on the amount of data indicated in the BSR being non-zero.

In some examples of the method, apparatuses, and non-transitory computer-readable medium described herein, the physical layer parameter may include a demodulation reference signal (DMRS) sequence of the second uplink communication, a transport block size (TBS) of the second uplink communication, a repetition level of the second uplink communication, or any combinations thereof. In some examples of the method, apparatuses, and non-transitory computer-readable medium described herein, the TBS and the repetition level of the second uplink communication may be determined based on a maximum TBS and a maximum repetition level configured for the contention-based uplink resources, and an amount of data indicated in a buffer status report (BSR) for the second uplink communication. In some examples of the method, apparatuses, and non-transitory computer-readable medium described herein, the one or more physical layer parameters may be transmitted using one or more of a medium access control (MAC) control element (MAC-CE), a multiplexed data transmission on a PUSCH, or any combinations thereof.

In some examples of the method, apparatuses, and non-transitory computer-readable medium described herein, the transmitting the first and second uplink communication further may include operations, features, means, or instructions for scrambling the first and second uplink communication using a same radio network temporary identifier (RNTI) associated with the UE. In some examples of the method, apparatuses, and non-transitory computer-readable medium described herein, the RNTI associated with the UE may be a value preconfigured at the UE by RRC signaling, or may be a value determined by allocated time and frequency resources associated with the first uplink transmission.

Some examples of the method, apparatuses, and non-transitory computer-readable medium described herein may further include operations, features, means, or instructions for monitoring, during the second uplink communication, for a PDCCH transmission from the base station that includes an early termination indication, and discontinuing the second uplink communication based on identifying the early termination indication from the base station. In some examples of the method, apparatuses, and non-transitory computer-readable medium described herein, the monitoring may include operations, features, means, or instructions for attempting to decode the PDCCH transmission based on a radio network temporary identifier (RNTI) associated the UE, and where the discontinuing may be further based on successfully decoding the PDCCH transmission.

Some examples of the method, apparatuses, and non-transitory computer-readable medium described herein may further include operations, features, means, or instructions for receiving, from the base station, configuration information that provides the first set of contention-free uplink resources allocated to the UE and the second set of contention-based uplink resources. In some examples of the method, apparatuses, and non-transitory computer-readable medium described herein, the configuration information for the first set of contention-free uplink resources allocated to the UE includes one or more of a periodicity of the first set of contention-free uplink resources, a time domain resource allocation of the first set of contention-free uplink resources, a frequency domain resource allocation of the first set of contention-free uplink resources, a UE-specific demodulation reference signal (DMRS) configuration, a transport block size (TBS) value of the first set of contention-free uplink resources, or a repetition level of the first set of contention-free uplink resources. In some examples of the method, apparatuses, and non-transitory computer-readable medium described herein, the periodic first set of time and frequency resources allocated to the UE may be dedicated resources or shared resources that may be shared with one or more other UEs according to an orthogonal multiplexing configuration provided with the configuration information.

In some examples of the method, apparatuses, and non-transitory computer-readable medium described herein, the configuration information for the second set of contention-based uplink resources includes one or more of a time domain resource allocation of the second set of contention-based uplink resources, a frequency domain resource allocation of the second set of contention-based uplink resources, one or more DMRS configurations of the second set of contention-based uplink resources, a maximum TBS of the second set of contention-based uplink resources, or a maximum repetition level of the second set of contention-based uplink resources. In some examples of the method, apparatuses, and non-transitory computer-readable medium described herein, the second set of time and frequency resources include two or more subsets of resources, and where the indication that the UE will transmit the second uplink communication includes a selection of one subset of resources of the two or more subsets of resources for the second uplink communication.

A method of wireless communication is described. The method may include configuring, by a base station, at least a first UE and a second UE with allocated contention-free preconfigured uplink resources (PUR) and contention-based PUR, where the first UE is configured with a first contention-free PUR and the second UE is configured with a second contention-free PUR that is non-overlapping with the first contention-free PUR, and where each of the first UE and the second UE have shared contention-based PUR, receiving, at the base station, a first uplink communication via the first contention-free PUR, the first uplink communication including a first indication that the first UE will transmit a second uplink communication using the shared contention-based PUR, and one or more physical layer parameters associated with the second uplink communication of the first UE, and receiving, at the base station via the contention-based PUR, the second uplink communication of the first UE using the one or more physical layer parameters associated with the second uplink communication of the first UE.

An apparatus for wireless communication is described. The apparatus may include a processor, memory in electronic communication with the processor, and instructions stored in the memory. The instructions may be executable by the processor to cause the apparatus to configure, by a base station, at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR, receive, at the base station, a first uplink communication via the first contention-free PUR, the first uplink communication including a first indication that the first UE will transmit a second uplink communication using the shared contention-based PUR, and one or more physical layer parameters associated with the second uplink communication of the first UE, and receive, at the base station via the contention-based PUR, the second uplink communication of the first UE using the one or more physical layer parameters associated with the second uplink communication of the first UE.

Another apparatus for wireless communication is described. The apparatus may include means for configuring, by a base station, at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR, receiving, at the base station, a first uplink communication via the first contention-free PUR, the first uplink communication including a first indication that the first UE will transmit a second uplink communication using the shared contention-based PUR, and one or more physical layer parameters associated with the second uplink communication of the first UE, and receiving, at the base station via the contention-based PUR, the second uplink communication of the first UE using the one or more physical layer parameters associated with the second uplink communication of the first UE.

A non-transitory computer-readable medium storing code for wireless communication is described. The code may include instructions executable by a processor to configure, by a base station, at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR, receive, at the base station, a first uplink communication via the first contention-free PUR, the first uplink communication including a first indication that the first UE will transmit a second uplink communication using the shared contention-based PUR, and one or more physical layer parameters associated with the second uplink communication of the first UE, and receive, at the base station via the contention-based PUR, the second uplink communication of the first UE using the one or more physical layer parameters associated with the second uplink communication of the first UE.

In some examples of the method, apparatuses, and non-transitory computer-readable medium described herein, the first indication may include a BSR that indicates an amount of data to be transmitted by the first UE, and where at least a portion of the data to be transmitted by the first UE may be included in the second uplink communication of the first UE. Some examples of the method, apparatuses, and non-transitory computer-readable medium described herein may further include operations, features, means, or instructions for determining, based on a buffer size provided in the BSR being non-zero, that the first UE is to transmit the second uplink communication using the contention-based PUR.

In some examples of the method, apparatuses, and non-transitory computer-readable medium described herein, the physical layer parameter may be a DMRS sequence of the first UE, a TBS of the second uplink communication, a repetition level of the second uplink communication of the first UE, or any combinations thereof. In some examples of the method, apparatuses, and non-transitory computer-readable medium described herein, the TBS and repetition level of the second uplink communication may be determined based on a maximum TBS and repetition level configured for the contention-based uplink resource and the amount of data indicated in the BSR for the second uplink communication.

In some examples of the method, apparatuses, and non-transitory computer-readable medium described herein, the one or more physical layer parameters may be transmitted using one or more of a MAC-CE, a data transmission multiplexed on a PUSCH, or any combinations thereof. In some examples of the method, apparatuses, and non-transitory computer-readable medium described herein, the first and second uplink communications may be scrambled using a same first RNTI associated with the first UE. In some examples of the method, apparatuses, and non-transitory computer-readable medium described herein, the first RNTI associated with the first UE may be a value preconfigured by RRC signaling or a value determined based on time and frequency resources associated with the first uplink transmission.

Some examples of the method, apparatuses, and non-transitory computer-readable medium described herein may further include operations, features, means, or instructions for receiving a third uplink communication via the second contention-free PUR, the third uplink communication including a second indication that the second UE will transmit a fourth uplink communication using the contention-based PUR, and one or more physical layer parameters associated with the fourth uplink communication of the second UE, determining that the first UE and the second UE each selected a same contention-based PUR for the second uplink communication and the fourth uplink communication, the determining based on a same DMRS sequence being used for the second uplink communication and the fourth uplink communication, and transmitting, to the first UE, an early termination indication responsive to the determining. In some examples of the method, apparatuses, and non-transitory computer-readable medium described herein, the transmitting the early termination indication may include operations, features, means, or instructions for transmitting, via a PDCCH, a first identification of the first UE that directs the first UE to discontinue the second uplink communication.

In some examples of the method, apparatuses, and non-transitory computer-readable medium described herein, the configuring further may include operations, features, means, or instructions for transmitting, to each of the first UE and the second UE, configuration information that provides the contention-free PUR and the contention-based PUR. In some examples of the method, apparatuses, and non-transitory computer-readable medium described herein, the configuration information for the contention-free PUR includes one or more of a periodicity of the resource, a time domain resource allocation, a frequency domain resource allocation, a UE-specific DMRS configuration, a TBS value or a repetition level associated with the contention-free PUR.

In some examples of the method, apparatuses, and non-transitory computer-readable medium described herein, the configuration information further includes, for the contention-based PUR, one or more of a time domain resource allocation, a frequency domain resource allocation, one or more DMRS configurations, a maximum TBS, or a maximum repetition level associated with the contention-free PUR.

In some examples of the method, apparatuses, and non-transitory computer-readable medium described herein, the contention-based PUR include two or more subsets of resources, and where the indication that the UE will transmit the second uplink communication includes an indication of one subset of resources of the two or more subsets of resources for the second uplink communication.

DETAILED DESCRIPTION

Figure 1:
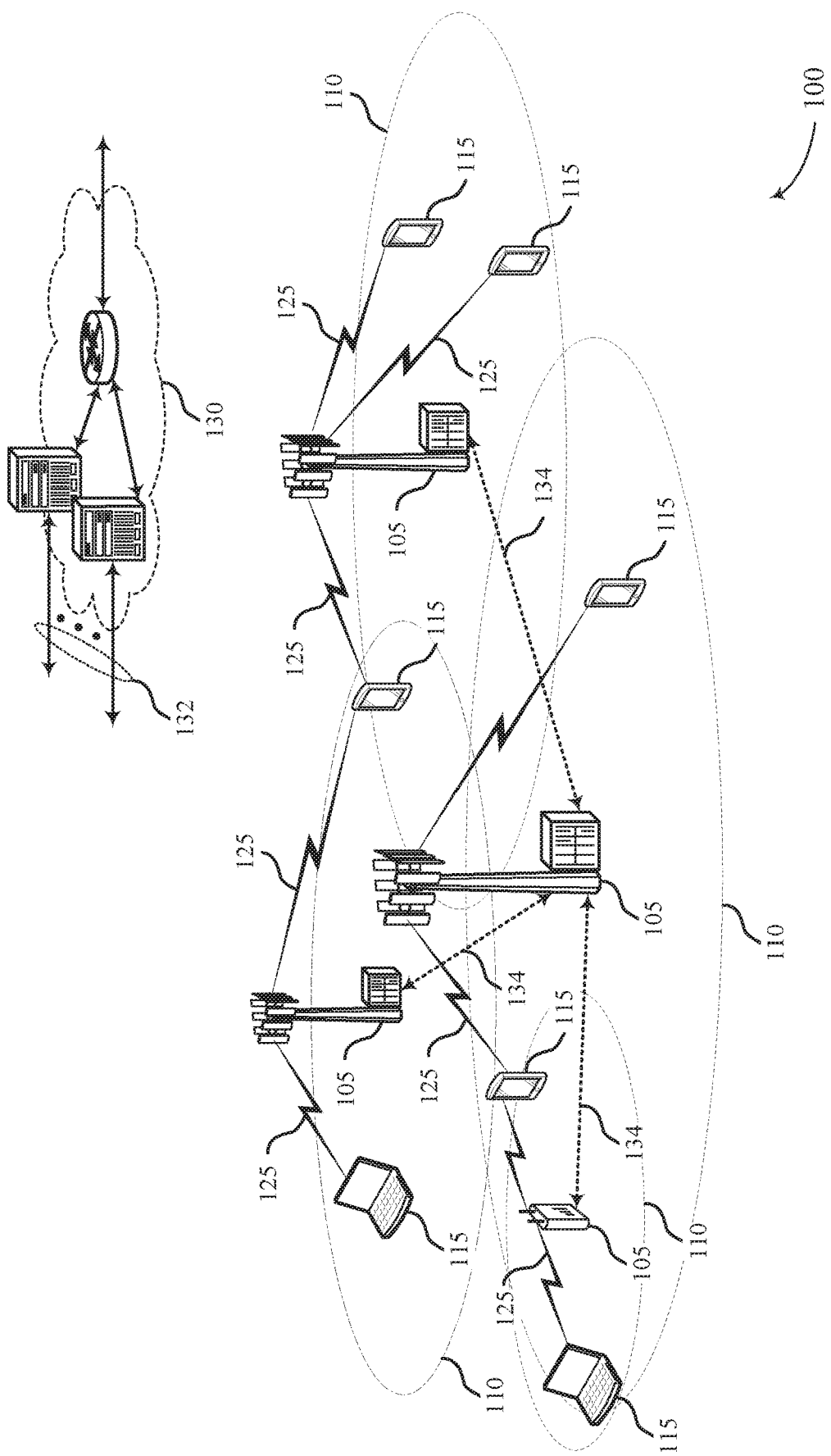
FIG. 1 illustrates an example of a system for wireless communications that supports uplink transmission techniques using preconfigured resources in wireless communications in accordance with aspects of the present disclosure.

Various aspects of the disclosure provide techniques for configuring contention-free uplink resources and contention-based uplink resources as preconfigured uplink resources (PUR) available for a user equipment (UE) to transmit one or more uplink transmissions without a specific allocation for the uplink transmission from a base station. In some cases, each of two or more UEs may be configured with separate portions of contention-free PUR that each UE may use to transmit a relatively small first uplink communication that provides an indication that the UE will transmit a relatively larger second uplink communication using contention-based PUR. In some cases, the UE may transmit a buffer status report (BSR) using the contention-free PUR, and a non-zero value for the amount of data to be transmitted may indicate to the base station that the UE will transmit using the associated contention-based PUR. Further, in some cases, the first communication may provide an indication of one or more physical layer parameters associated with the second uplink communication. The UE may transmit the second uplink communication using the indicated one or more physical layer parameters via the contention-based uplink resource.

As discussed herein, in some cases one or more UEs may have relatively strict latency requirements, relatively frequent transmissions of data, or combinations thereof. Some systems (e.g., some LTE or NR systems), may provide preconfigured uplink resources to allow such UEs to transmit using a relatively small amount of overhead. For example, a UE while in an idle (or RRC INACTIVE) or connected mode may utilize PUR to transmit data.

Such systems may provide three types of preconfigured resources. A first type of PUR may include dedicated PUR which may provide a shared channel (e.g. physical uplink shared channel (PUSCH)) resource used by a single UE. The PUSCH resource may be a time and/or frequency resource, and the dedicates PUR may be contention-free, in that multiple UEs will not have colliding transmissions due to the resources being dedicated to a UE. A second type of PUR may include contention-free shared preconfigured uplink resources (CFS PUR), in which a PUSCH resource may be simultaneously used by more than one UE. In such CFS PUR, the PUSCH resource may be a time-frequency resource, and CFS PUR may be contention-free trough orthogonal multiplexing (e.g., orthogonal code division multiplexing) of UEs within the PUSCH resource. A third type of PUR may include contention-based shared preconfigured UL resource (CBS PUR), in which a PUSCH resource may be simultaneously used by more than one UE. In such CBS PUR, the PUSCH resource is at least a time-frequency resource, and CBS PUR is contention-based (i.e., CBS PUR may require contention resolution) due to more than one UE being able to select a same resource for an uplink transmission.

When transmitting using contention based PUR, in addition to time and frequency resources for contention based PUR, a base station may also configure one or more physical layer parameters for an uplink transmissions such as one or more demodulation reference signal (DMRS) sequences, a transport block size (TBS) or modulation and coding scheme (MCS) for the PUSCH transmission, one or more repetition levels for PUSCH when operating in a coverage enhancement mode, one or more power control parameters, or any combinations thereof. In cases where multiple DMRS sequences and RNTI are configured for one contention-based PUR, the UE may randomly select one and use it for the uplink PUSCH transmission, and thus a same DMRS/RNTI may be selected by different UEs, and therefore contention resolution may be needed in such cases.

While contention-based PUR may provide for more efficient use of network resources, it also increases blind detection complexity for contention-based PUR, due to the base station not knowing apriori which UE will be transmitting in contention-based PUR, and thus blind detection is required. When the number of UEs is large, the blind detection complexity may be a burden at the base station. Further, UE power consumption and spectral efficiency for contention-based PUR may be less than optimal, because certain physical layer parameters (e.g., TBS, MCS, repetition level, etc.) may have a common configuration in order to lower blind detection complexity. However, some UEs may also be able to use higher-order MCS (e.g., due to better channel quality), or smaller TBS (e.g., due to smaller amount of data), or lower repetition level (e.g., due to better SNR), relative to the PUR-common configuration. Thus, by forcing such UEs to use the common configurations of MCS/TBS/repetition-level, the power consumption and spectral efficiency at these UEs may be degraded. Additionally, because a receiving base station may not know which UE will be transmitting in contention-based PUR, for the cases of DMRS or RNTI collision, the base station may not be able to tell which DMRS is chosen by which UE (or not be able to know the existence of RNTI collision). Extra schemes to enable contention resolution may therefore be desired.

Techniques such as provided herein allow for a hybrid use of contention-free PUR and contention-based PUR, in which a UE may be configured with both contention-free PUR (either dedicated or shared PUR) and contention-based PUR. As indicated above, the contention-free PUR may be used for periodic and relatively small data transmission and indication of the intention to use the contention-based PUR for large data transmission (e.g., a BSR transmission and one or more physical layer parameters to signal an intention to use contention-based PUR), and the contention-based PUR may be used for aperiodic and relatively large data transmissions. In some cases, the contention-free PUR may be used to provide physical layer parameters such as a selected DMRS sequence of the transmission, TBS/MCS of the transmission, repetition-level (e.g., which may be smaller than the configured maximum TBS/repetition-level for contention-based PUR), or any combination thereof. The base station, from the received UE reports, may determine which UE will transmit on the contention-based PUR and identify any collision and contention resolution may be indicated to the UEs. This can be realized via, for example, a UE-specific RNTI that may be configured at the transmitting UE via dedicated RRC and determined based on the time/frequency resources of contention-free PUR, such that different UEs use different RNTI.

Such techniques may provide advantages to a base station by, for example, reducing blind detection complexity based on prior knowledge of which UEs intend to transmit in the contention-based PUR, and also on prior knowledge of the corresponding physical layer parameter(s) (e.g., DMRS, TBS, MCS, repetition-level). UEs may also benefit by having reduced power, as contention-free PUR is used only for small packets and spectral efficiency can be improved by the UE determining the TBS/MCS/repetition-level for an uplink transmission, and contention resolution can be realized to further save UE power. Further, system resource utilization can also be improved as a base station may release contention-based PUR if unclaimed by any UEs (e.g., if each UE provides a BSR of zero in contention-free PUR, the base station may release the corresponding contention-based PUR).

Aspects of the disclosure are initially described in the context of a wireless communications system. Various examples of wireless resources and process flows of some examples and then described. Aspects of the disclosure are further illustrated by and described with reference to apparatus diagrams, system diagrams, and flowcharts that relate to uplink transmission techniques using preconfigured resources in wireless communications.

FIG. 1 illustrates an example of a wireless communications system 100 that supports uplink transmission techniques using preconfigured resources in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. UEs 115 and base stations 105 may use preconfigured uplink resources for some uplink transmissions, which may include both contention-free PUR and contention-based PUR.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

In some cases, a base station 105 may configure two or more UEs 115 with PUR that may help reduce signaling overhead associated with uplink transmissions of the UEs 115. In some cases, a base station 105 may configure the UEs 115 with contention-free PUR and contention-based PUR that may be used by the UEs 115 to transmit one or more uplink transmissions without a specific allocation for the uplink transmission. In some cases, each of two or more UEs 115 may be configured with separate portions of contention-free PUR that each UE 115 may use to transmit a relatively small first uplink communication that provides an indication that the UE 115 will transmit a relatively larger second uplink communication using contention-based PUR. In some cases, the UE 115 may transmit a BSR using the contention-free PUR, and a BSR with a non-zero value for the amount of data to be transmitted may indicate to the base station 105 that the UE 115 will transmit using the associated contention-based PUR. Further, in some cases, the first uplink communication may provide an indication of one or more physical layer parameters associated with the second uplink communication. The UE 115 may transmit the second uplink communication using the indicated one or more physical layer parameters via the contention-based uplink resource.

Figure 2:
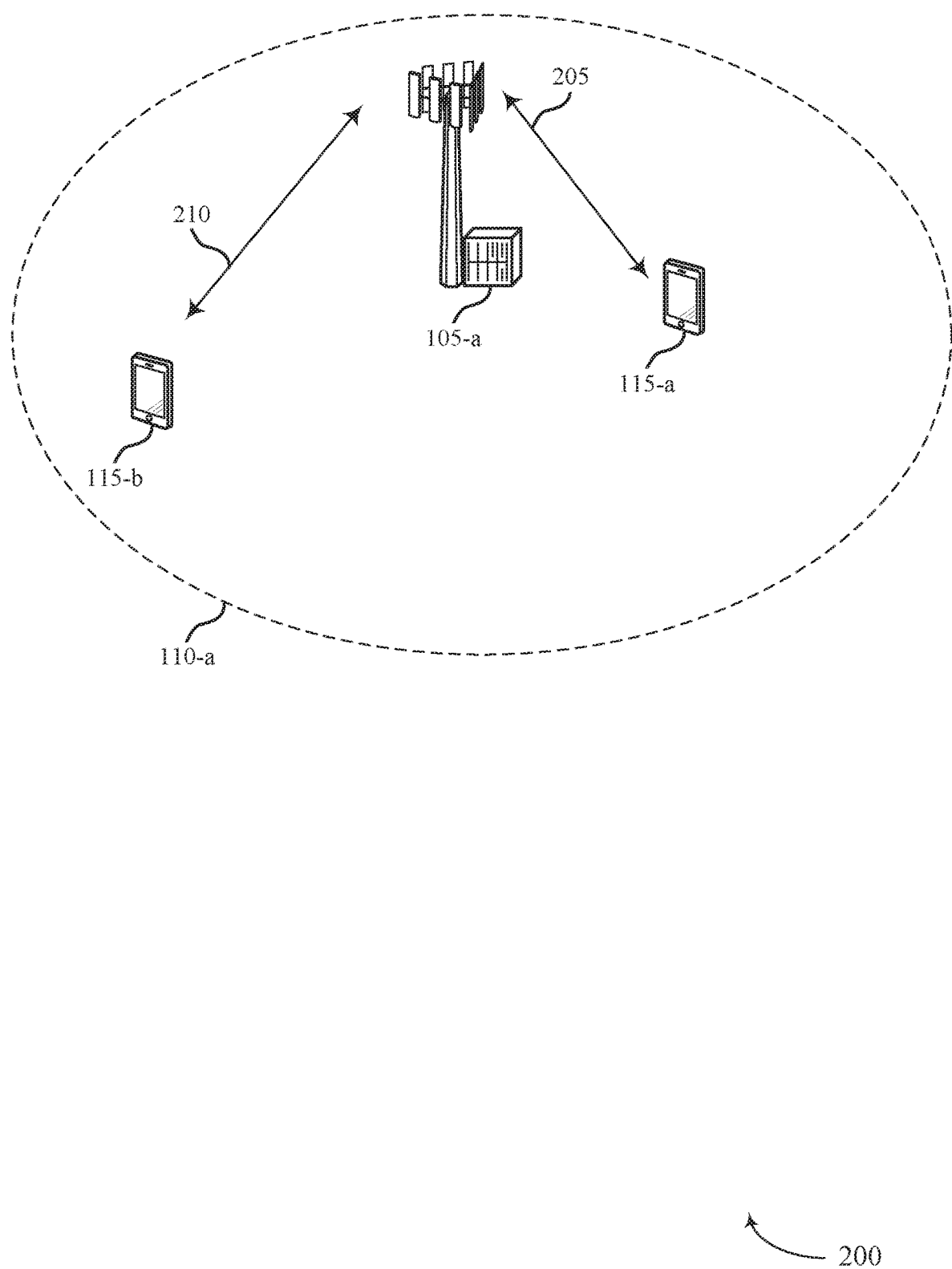
FIG. 2 illustrates an example of portion of a wireless communications system that supports uplink transmission techniques using preconfigured resources in wireless communications in accordance with aspects of the present disclosure.

FIG. 2 illustrates an example of a wireless communications system 200 that supports uplink transmission techniques using preconfigured resources in wireless communications in accordance with aspects of the present disclosure. In some examples, wireless communications system 200 may implement aspects of wireless communications system 100. In this example, a base station 105-*a* may establish a first connection 205 with a first UE 115-*a*, and may establish a second connection 210 with a second UE 115-*b*. Base station 105-*a* may establish other connections with other UEs within coverage area 110-*a* as well, with two UEs 115 illustrated in FIG. 2 for purposes of discussion and illustration.

In this example, the base station 105-*a* may allocate preconfigured uplink resources for each UE 115, which may be used for uplink transmissions without a specific uplink resource request or grant from the base station 105-*a*. In some cases, each UE 115 may be RRC preconfigured with a contention-free PUR and a contention-based PUR that is associated with the contention-free PUR. Each PUR may contain its own time-frequency resource allocation information.

In some cases, the base station 105-*a* may further configure each UE 115 with an associated RNTI, namely contention-free RNTI (CF-RNTI), which may also be configured to the UE 115 via RRC, and which is UE-specific. Using the contention-free PUR, each UE 115 can transmit a BSR in the contention-free PUR. The BSR may be provided in a medium access control (MAC) control element (MAC-CE) message, which may include information on an amount of uplink data buffered at the UE 115. If the BSR indicates that the associated UE 115 has buffered data, the base station 105-*a* may determine that the UE 115 intends to use the following time domain instance of the associated contention-based PUR to transmit the buffered data. In other cases, a threshold value may be associated with the BSR (e.g., if the reported amount of buffered data exceeds a minimum TBS), and the base station 105-*a* may determine that the UE 115 will use the corresponding contention-based PUR if the amount of buffered data meets or exceeds the threshold value. In some cases, the threshold value may also be RRC configured to the UE 115 together with the configuration of the contention-based PUR.

The UEs 115, when transmitting using the contention-free PUR, may also transmit one or more physical layer parameters, such as, for example, MCS, TBS, repetition-level, or any combinations thereof, in the contention-free PUR, in a same time-domain instance with the transmitted BSR. Such a contention-free PUR transmission may be referred to as a first transmission by the corresponding UE 115. The transmitted physical layer parameter(s) (e.g., MCS/TBS/repetition-level) may be based at least in part on local measurements made at the UE 115. In such cases, if the first transmission includes a BSR and corresponding physical layer parameter(s) (e.g., MCS/TBS/repetition-level) that shows that there will be data transmitted in the following time-domain instance of contention-based PUR, the base station 105-*a* may interpret that the data will be transmitted using the reported physical layer parameter(s). In some cases, the physical layer parameter(s) may be conveyed by any combinations of MAC-CE messages, PUCCH transmissions, predefined physical layer channels, or any combinations thereof.

In some cases, the determination of the TBS and repetition level at the UE may be based on the amount of a maximum TBS and repetition level configured for the contention-based PUR and the amount of data indicated in the BSR for the transmission using the contention-based PUR. For example, if maximum TBS for the contention-based transmission is 1024 bits and the network configured repetition level is Rmax=256, and the BSR indicates only 400 bits to be transmitted, then the UE may select a TBS larger than 400 bits but less than 1024 bits, such as 512. And then the reported repetition level can be the smallest repetition level equal or greater than 512/1024*256 (e.g., 128).

In some cases, in the first transmission using the contention-free PUR, together with the physical layer parameter(s), the UE 115 can also report a DMRS sequence. The base station 105-*a* in such cases may interpret that this reported DMRS sequence will be used in the intended transmission using the contention-based PUR, which may be referred to as a second transmission. The DMRS sequence reporting can be conveyed by any combinations of MAC-CE messages, PUCCH, or predefined physical layer channel(s). In the contention-based PUR, if a UE 115 has buffered data to transmit, it may use the CF-RNTI to scramble the data, and uses the reported physical layer parameter(s) to transmit the data.

In the event of a collision of transmissions of both the first UE 115-*a* and the second UE 115-*b*, a contention resolution may be performed. For example, during the uplink transmission in contention-based PUR, each UE 115 may monitor a physical downlink control channel (PDCCH) search space, by descrambling the PDCCH using its CF-RNTI. The PDCCH search space may be configured during the RRC configuration of PURs, for example.

If the base station 105-*a* finds that multiple UEs 115 choose the same DMRS sequence, an early uplink termination indication may be transmitted in the PDDCH monitored by one or more of the colliding UEs 115, by scrambling the indication using the CF-RNTI corresponding to the desired UE(s) 115. The UE(s) 115 that are early uplink terminated may be selected by the base station 105-*a* based on one or more factors, such as based on relative amounts of uplink data to be transmitted, for example. If a UE 115 detects its RNTI in the monitored PDCCH, the UE 115 stops its uplink transmission as early as possible. In such a manner, some initially colliding transmissions may be successfully received at the base station 105-*a* based on receptions after the colliding transmission is stopped, while the other colliding UE 115 terminates its uplink transmissions and may avoid wasting transmit power on communications that have a low likelihood of being successfully received.

In some cases, the single contention-free PUR associated to a single contention-based PUR, can be extended to a single contention-free PUR associated to multiple contention-based PURs. In such cases, a UE 115 may be configured a single contention-free PUR and multiple contention-based PURs (each associated with a different subset of contention-based PUR resources) associated to this contention-free PUR. Each contention-based PUR may be associated to a different uplink data buffer at the UE 115. The UE 115 may periodically report multiple BSRs in the single contention-free PUR, each one corresponding to the intention to use a certain subset of contention-based PUR resources. Together with the BSRs, the UE 115 may also report multiple sets of parameters (e.g., BSR/DMRS/TBS/MCS/repetition-level), each set of parameters corresponding to the UL transmission using one of the contention-based PURs. In such cases, each set of parameters may correspond to a specific HARQ process ID, and the connection between different sets of parameters and different contention-based PURs may be RRC configured during the configuration of PURs. In other cases, the UE may still report a single BSR and a single set of physical layer parameters, along with an additional explicit indication of which contention-based PUR is going to be used that is supplied by the UE, together with the BSR.

Figure 3:
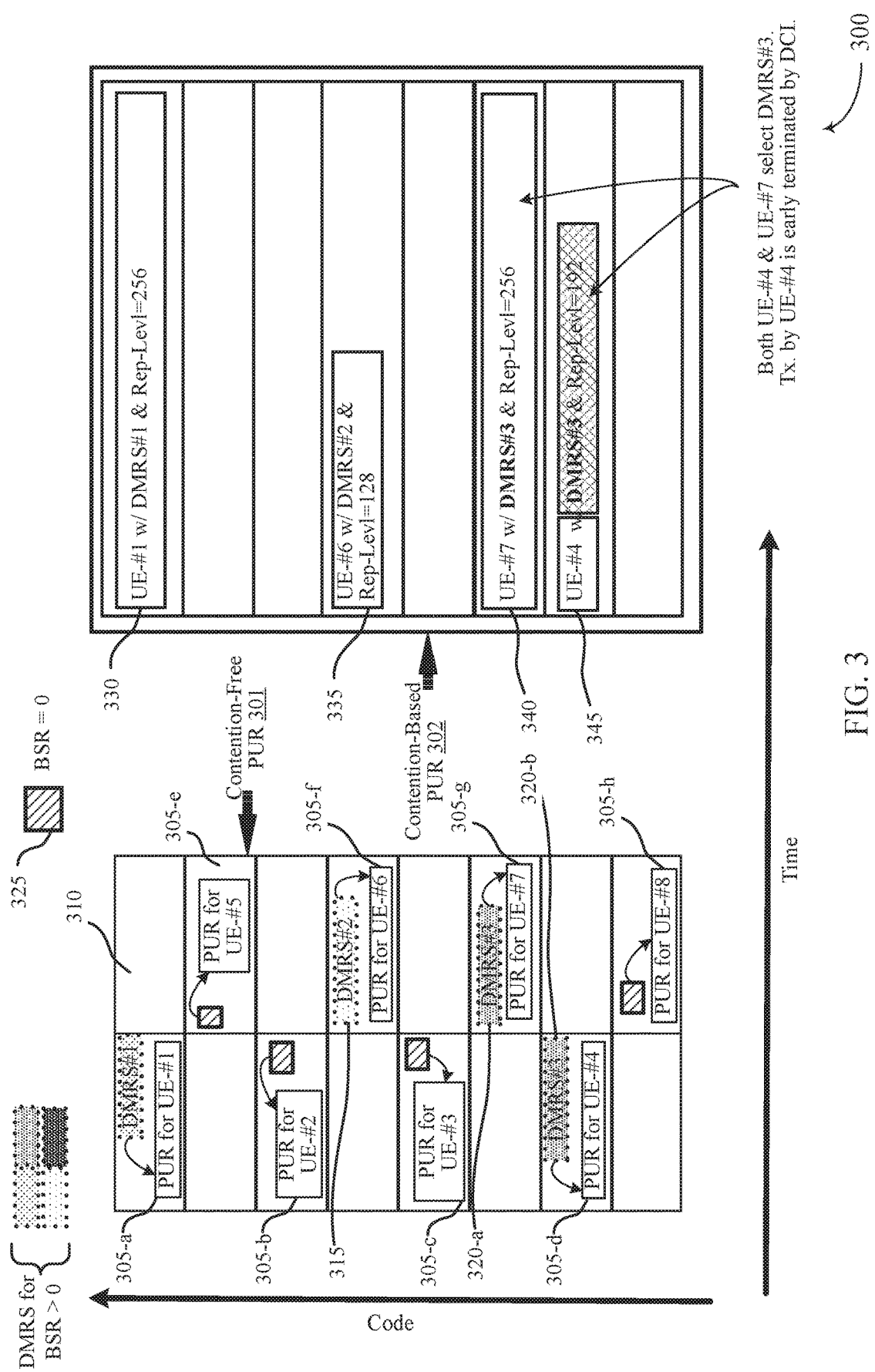
FIG. 3 illustrates an example of a preconfigured uplink resources that supports uplink transmission techniques using preconfigured resources in wireless communications in accordance with aspects of the present disclosure.

FIG. 3 illustrates an example of a preconfigured uplink resources 300 that supports uplink transmission techniques using preconfigured resources in wireless communications in accordance with aspects of the present disclosure. In some examples, preconfigured uplink resources 300 may implement aspects of wireless communications system 100 or 200. In this example, contention-free PUR 301 and contention-based PUR 302 may be configured by a base station (e.g., a base station 105 of FIG. 1 or 2) may be configured.

In this example, eight UEs may be configured with contention-free PUR resources 305, in which each UE may have a corresponding allocated contention-free PUR resource that may be non-overlapping with other contention-free PUR resources 305. In this example, four UEs (UE #1, UE #4, UE #6, and UE #7) may transmit a BSR using corresponding DMRS sequences 310, 315, 320-a, and 320-b. The PUR resources 300 in this example may be in a common frequency band for both the contention-free PURs 301 and contention-based PURs 302.

In this example, the configured UEs may be code division multiplexed (CDMed) using scrambling sequences related to their RNTIs, in which a first four UEs may be CDMed in a first time domain portion of the contention-free PURs 301, and in which a second four UEs may be CDMed using scrambling sequences related to their RNTIs in a second time domain portion of the contention-free PURs 301. In each time instance, each UE is configured with a UE-specific DMRS sequence. Thus the 4 available DMRS sequences can be used by 4 UEs within each time instance. In this case, the contention-free PUR is a shared contention-free PUR, as different UEs use the same time-frequency resource, but use codes (i.e., sequences related to CF-RNTI) to multiplex the different UEs.

For the contention-based PUR 302 the eight UEs may be configured using the same contention-based PUR 302, and each UE may use its UE-specific RNTI to scramble its data when transmitting uplink data. Each UE may use a DMRS sequence, which is randomly selected from the 4 DMRS sequences. Therefore DMRS collisions or contention would happen if two UEs select the same DMRS sequence. The DMRS sequence may be reported using the contention-free PUR 305 communication in advance of the contention-based PUR communication. In this example, UE #1, UE #4, UE #6, and UE #7 report BSRs showing enough data buffered to be transmitted using the following contention-based PUR 302. In this example, UE-#1 reports DMRS-#1 310; UE-#6 reports DMRS-#2 315; both UE-#4 and #7 report DMRS-#3 320-a and 320-b, respectively.

UE-#1 and UE-#6 may transmit their uplink data by scrambling the data using their UE-specific CF-RNTIs and using their reported physical layer parameter(s) (e.g., DMRS/MCS/TBS/repetition-level) in the contention-based PUR 302, as communications 330 and 335, respectively, without any collision. But UE-#4 and UE-#7 choose the same DMRS-#3 320, and this contention may be detected by the base station. Further, these two UEs also start their uplink transmissions 340 and 345, respectively, in the contention-based PUR 302 by scrambling their uplink data using their CF-RNTIs and using their reported physical layer parameter(s) (e.g., DMRS/MCS/TBS/repetition-level, in this example). In this case, the base station may transmit, via a PDCCH, an early termination indication (e.g., in downlink control information (DCI) to be monitored by UE-#4, by scrambling this DCI using the CF-RNTI=#4, at the time instance where UE-#4 starts its UL repetitions in the contention-based PUR. UE-#4 may decode this early termination indication from the monitored DCI by descrambling the DCI using CF-RNTI=#4, and UE-#4 may terminates its uplink repetitions 345 at an early stage. After UE-#4 terminates its uplink repetitions 345, UE-#7 has no further contention. Contention is therefore resolved, while the power of UE-#4 is saved since it does not need to consume meaningless power on the colliding repetitions. Such techniques may allow the UEs to use their desired TBS/MCS/repetition-level to transmit, which may enhance power saving and spectral efficiency. Further, the base station has the information on which UEs transmit on the contention-based PUR based on the reporting in the contention-free PUR and also the related DMRS/TBS/MCS/repetition-level. Thus the decoding complexity is reduced compared to a purely blind decoding.

Figure 4:
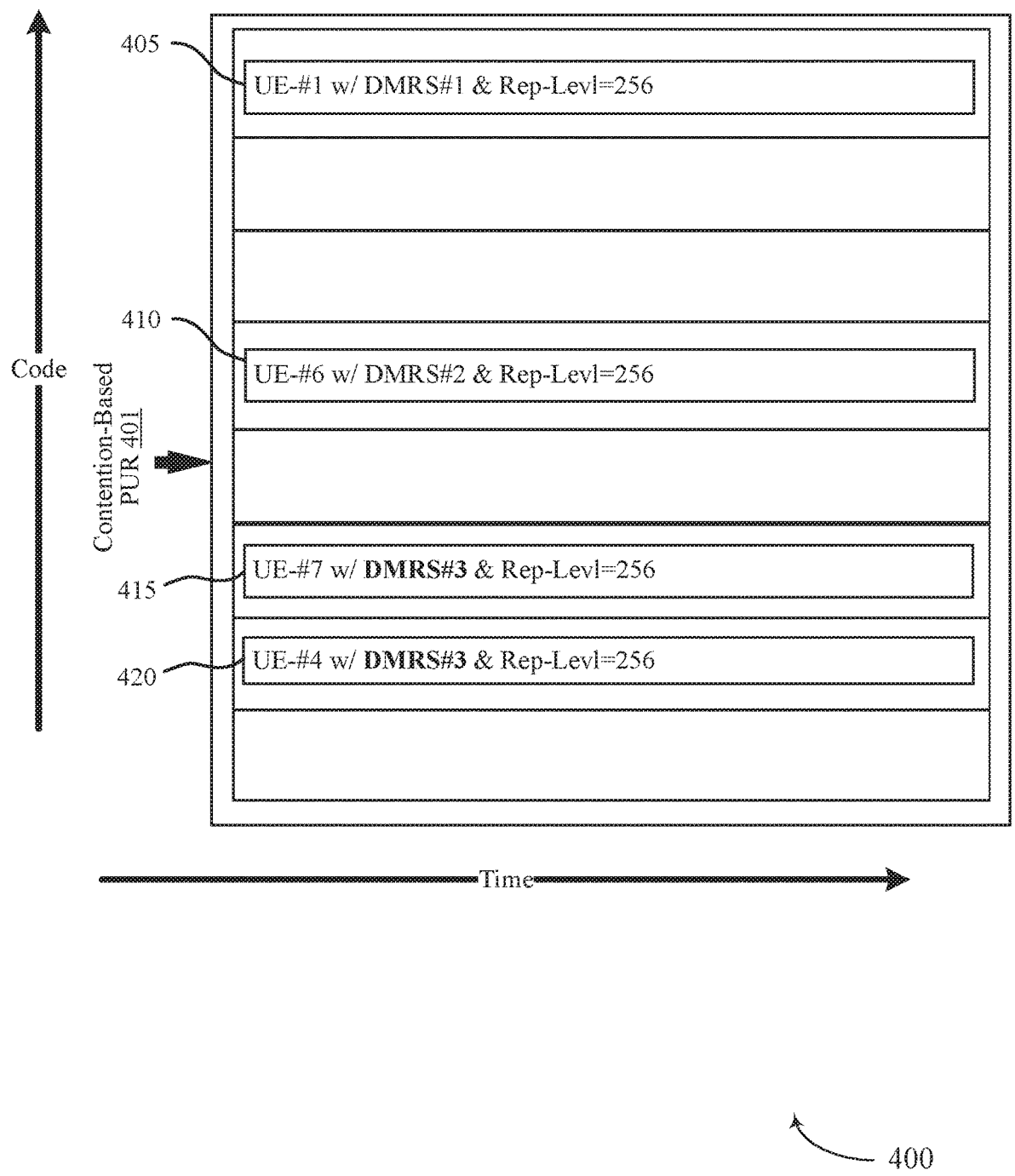
FIG. 4 illustrates another example of a preconfigured uplink resources that supports uplink transmission techniques using preconfigured resources in wireless communications in accordance with aspects of the present disclosure.

FIG. 4 illustrates another example of a preconfigured uplink resources 400 that supports uplink transmission techniques using preconfigured resources in wireless communications in accordance with aspects of the present disclosure. In some examples, preconfigured uplink resources 400 may implement aspects of wireless communications system 100 or 200. In this example, contention-based PUR 401 are illustrated without corresponding contention-free PUR. In this example, similarly as with the example of FIG. 3, four DMRS sequences may be used, and eight UEs may be present that may transmit using contention-based PUR 401.

In such cases, contention-free PUR are not available for indicating any physical layer parameter(s), and in such cases it may be assumed that all UEs should use a maximum repetition-level (e.g., 256), the same TBS, and the same MCS. In this example, similarly as with the example of FIG. 3, UE-#1, UE #4, UE #6, and UE #7 transmit in the contention-based PUR 401, with UE-#1 selecting DMRS-#1; UE-#6 selecting DMRS-#2; both UE-#4 and #7 selecting DMRS-#3. When comparing the example of FIG. 4 to the example of FIG. 3, all UEs need to use the maximum repetition-level to enable a low-complexity blind detection at the base station. Relative to the example of FIG. 3, UE-#4 and UE-#6 carry out more repetitions than they actually need, therefore power consumption of these UEs is higher than the in the example of FIG. 3. Similarly, the physical layer parameter(s) (e.g., TBS and MCS) of these UEs would also be different from the ones that they actually desire to use based on local measurements of the UEs, which may either waste their power or degrade their spectral efficiency, relative to the example of FIG. 3. Additionally, UE-#4 and UE-#7 have DMRS collision. However, the base station has no idea of this collision, and therefore contention resolution is also difficult to be provided by the NW. Thus these UEs may incur increased power usage on the communications and repetitions that the NW 305 may not correctly decode, which may degrade overall system performance.

Figure 5:
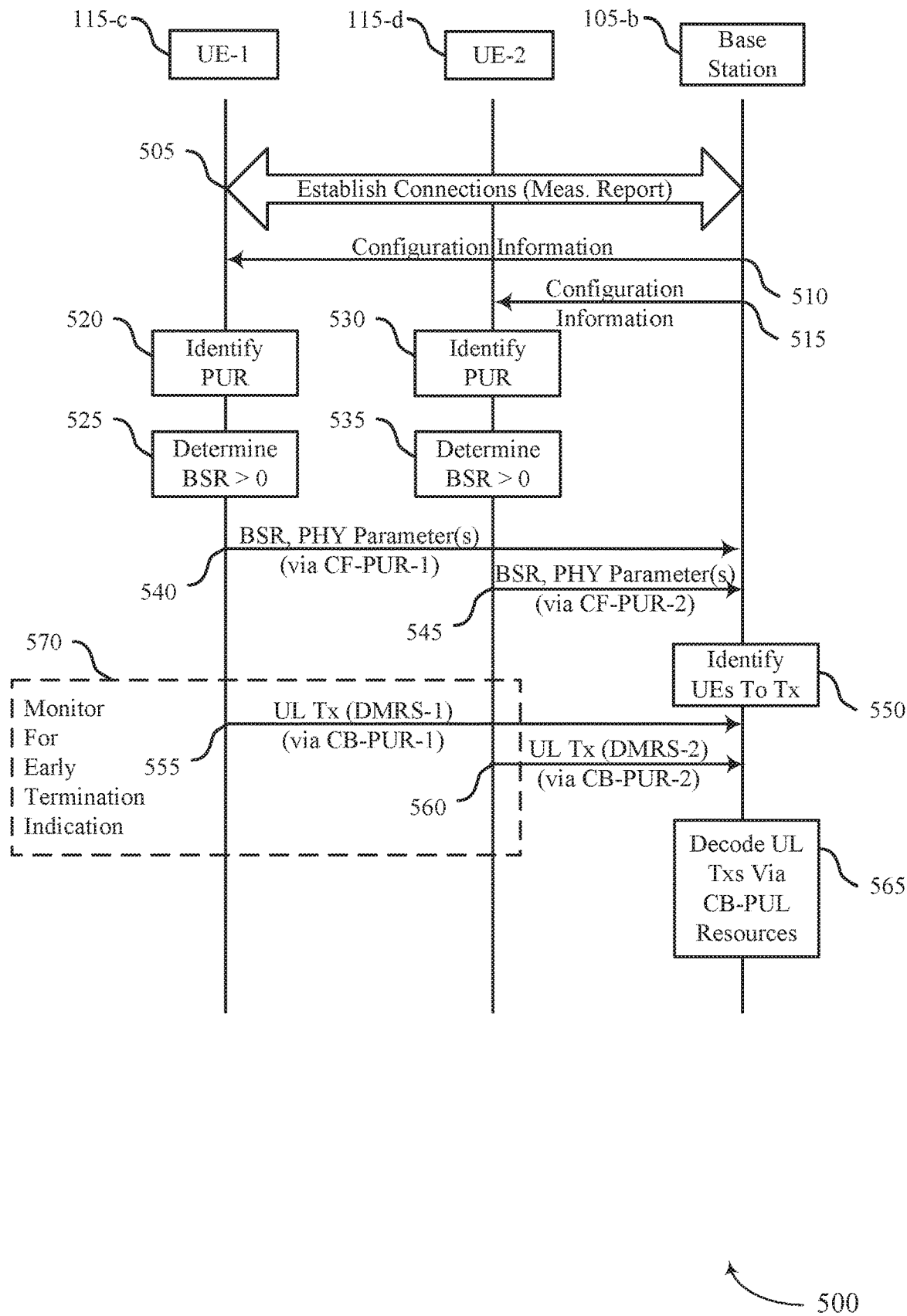
FIG. 5 illustrates an example of a process flow that supports uplink transmission techniques using preconfigured resources in wireless communications in accordance with aspects of the present disclosure.

FIG. 5 illustrates an example of a process flow 500 that supports uplink transmission techniques using preconfigured resources in wireless communications in accordance with aspects of the present disclosure. In some examples, process flow 500 may implement aspects of wireless communications system 100 or 200. In this example, process flow may include a first UE 115-c, a second UE 115-d, and a base station 105-b, which may each be examples of the corresponding devices described with respect to FIGS. 1-5.

At 505, the base station 105-b may establish a connection with each of the first UE 115-c and the second UE 115-d. Such a connection establishment may be performed using established connection establishment techniques, such as a random access procedure. In some cases, as part of the connection establishment, each UE 115 may perform measurements and format a measurement report. In some cases, UEs 115 may periodically perform measurement reports, and in various aspects of the present disclosure such reports may be periodically generated and transmitted to the UE 115-b.

At 510, the base station 105-b may transmit configuration information to the first UE 115-c. Such configuration information may include contention-free PUR configuration, contention-based PUR configuration, RNTI configuration, and the like. In some cases, the configuration information may be signaled using RRC signaling. Similarly, at 515, the base station 105-b may transmit configuration information to the second UE 115-d. Such configuration information may also include contention-free PUR configuration, contention-based PUR configuration, RNTI configuration, and the like. In some cases, the configuration information may be signaled using RRC signaling. The contention-free PUR configuration of each of the first UE 115-c and second UE 115-d may be non-overlapping with each other, as well as with any other UEs 115 that may be configured with PUR by the base station 105-b.

At 520, the first UE 115-c may identify its configured PUR. Such an identification may include identifying contention-free PUR for a first communication to the base station 105-b and a contention-based PUR for a second communication to the base station 105-b. Similarly, at 530, the second UE 115-d may identify its configured PUR. Such an identification may include identifying contention-free PUR for a third communication to the base station 105-b and a contention-based PUR for a fourth communication to the base station 105-b.

At 525, the first UE 115-c may determine that its BSR exceeds zero. Similarly, at 535, the second UE 115-d may determine that its BSR exceeds zero. In some cases, the BSR may identify the total amount of data available at the UE 115 across all logical channels of a logical channel group after all MAC PDUs for the TTI have been built. The first UE 115-c may, at 540, transmit its BSR and one or more physical layer parameter(s) in a first communication, and the second UE 115-d may, at 545, transmit its BSR and one or more physical layer parameter(s) in a third communication, to the base station 105-b. The BSR and one or more physical layer parameter(s) may be transmitted by each UE using the associated contention-free resources.

The base station 105-b may, at 550, determine the UEs that are to transmit using the contention-based PUR. Such a determination may be made based on a configured RNTI that is used by each UE 115 to scramble their transmissions in the contention-free PUR.

At 555, the first UE 115-c may transmit a second communication to the base station 105-b. The second communication may use a first DMRS sequence (DMRS-1) and may be transmitted via contention-based PUR (CB-PUR-1). Further, at 560, the second UE 115-d may transmit a fourth communication to the base station 105-b. The fourth communication may use a second DMRS sequence (DMRS-2) and may be transmitted via contention-based PUR (CB-PUR-2). Because the second communication and the fourth communication use different DMRS sequences, there is not a collision between the two communications and the base station 105-b may receive and decode, at 565, each of the concurrent transmissions.

As indicated at 570, while transmitting the second communication and the fourth communication, each of the first UE 115-c and the second UE 115-d may monitor for an early termination indication. In this example, because there is not a collision between the first communication and the fourth communication, neither UE 115 receives an early termination indication.

Figure 6:
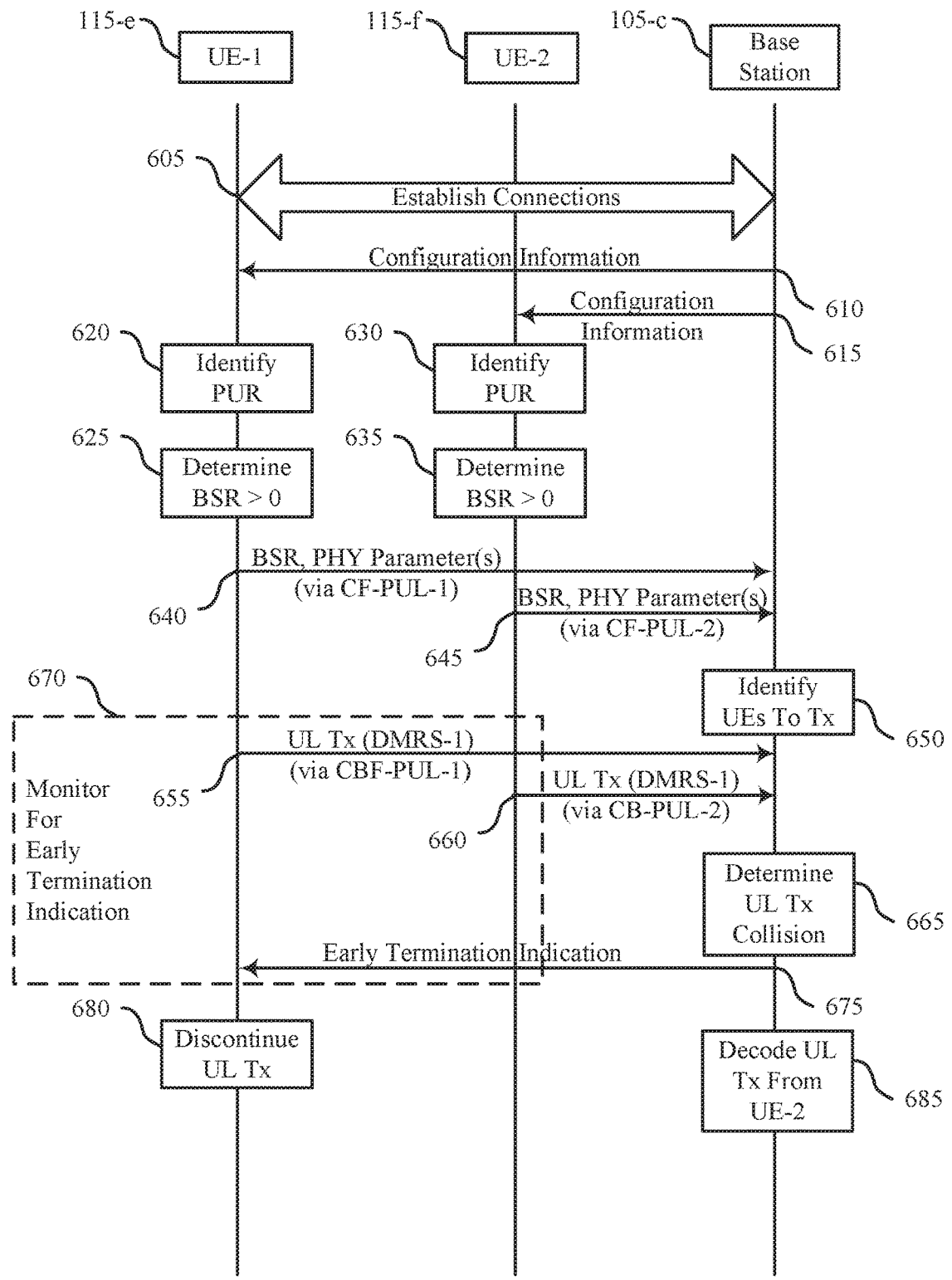
FIG. 6 illustrates another example of a process flow that supports uplink transmission techniques using preconfigured resources in wireless communications in accordance with aspects of the present disclosure.

FIG. 6 illustrates an example of a process flow 600 that supports uplink transmission techniques using preconfigured resources in wireless communications in accordance with aspects of the present disclosure. In some examples, process flow 600 may implement aspects of wireless communications system 100 or 200. In this example, process flow may include a first UE 115-e, a second UE 115-f, and a base station 105-c, which may each be examples of the corresponding devices described with respect to FIGS. 1-5.

At 605, the base station 105-c may establish a connection with each of the first UE 115-e and the second UE 115-f. Such a connection establishment may be performed using established connection establishment techniques, such as a random access procedure. In some cases, as part of the connection establishment, each UE 115 may perform measurements and format a measurement report. In some cases, UEs 115 may periodically perform measurement reports, and in various aspects of the present disclosure such reports may be periodically generated and transmitted to the UE 115-c.

At 610, the base station 105-c may transmit configuration information to the first UE 115-e. Such configuration information may include contention-free PUR configuration, contention-cased PUR configuration, RNTI configuration, and the like. In some cases, the configuration information may be signaled using RRC signaling. Similarly, at 615, the base station 105-c may transmit configuration information to the second UE 115-f. Such configuration information may also include contention-free PUR configuration, contention-cased PUR configuration, RNTI configuration, and the like. In some cases, the configuration information may be signaled using RRC signaling. The contention-free PUR configuration of each of the first UE 115-e and second UE 115-f may be non-overlapping with each other, as well as with any other UEs 115 that may be configured with PUR by the base station 105-c.

At 620, the first UE 115-e may identify its configured PUR. Such an identification may include identifying contention-free PUR for a first communication to the base station 105-c and a contention-cased PUR for a second communication to the base station 105-c. Similarly, at 630, the second UE 115-f may identify its configured PUR. Such an identification may include identifying contention-free PUR for a third communication to the base station 105-c and a contention-cased PUR for a fourth communication to the base station 105-c.

At 625, the first UE 115-e may determine that its BSR exceeds zero. Similarly, at 635, the second UE 115-f may determine that its BSR exceeds zero. In some cases, the BSR may identify the total amount of data available at the UE 115 across all logical channels of a logical channel group after all MAC PDUs for the TTI have been built. The first UE 115-e may, at 640, transmit its BSR and one or more physical layer parameter(s) in a first communication, and the second UE 115-f may, at 645, transmit its BSR and one or more physical layer parameter(s) in a third communication, to the base station 105-c. The BSR and one or more physical layer parameter(s) may be transmitted by each UE using the associated contention-free resources.

The base station 105-c may, at 650, determine the UEs that are to transmit using the contention-cased PUR. Such a determination may be made based on a configured RNTI that is used by each UE 115 to scramble their transmissions in the contention-free PUR.

At 655, the first UE 115-e may transmit a second communication to the base station 105-c. The second communication may use a first DMRS sequence (DMRS-1) and may be transmitted via contention-cased PUR (CB-PUR-1). Further, at 660, the second UE 115-*f* may transmit a fourth communication to the base station 105-*c*. The fourth communication may also use the first DMRS sequence (DMRS-1) and may be transmitted via contention-cased PUR (CB-PUR-2). Because the second communication and the fourth communication use the same DMRS sequences, there is a collision between the two communications and the base station 105-*c* determine that the collision is present at 665 and may transmit at 675 an early termination indication to the first UE 115-*e*.

As indicated at 670, while transmitting the second communication and the fourth communication, each of the first UE 115-*e* and the second UE 115-*f* may monitor for an early termination indication. In this example, because there is a collision between the first communication and the fourth communication, the first UE 115-*e* may detect the early termination indication and may, at 680, determine to discontinue its uplink transmission using the contention-based PUR, while in this example the second UE 115-*f* continues to transmit the fourth transmission.

At 685, the base station 105-*c* may continue to receive the fourth transmission form the second UE, and attempt to decode the transmission. In some cases, the second transmission may be discontinued before repetitions of the fourth communication, and the base station 105-*c* may use transmission repetitions transmitted without any colliding transmissions, and may be able to successfully receive and decode the fourth communication.

Figure 7:
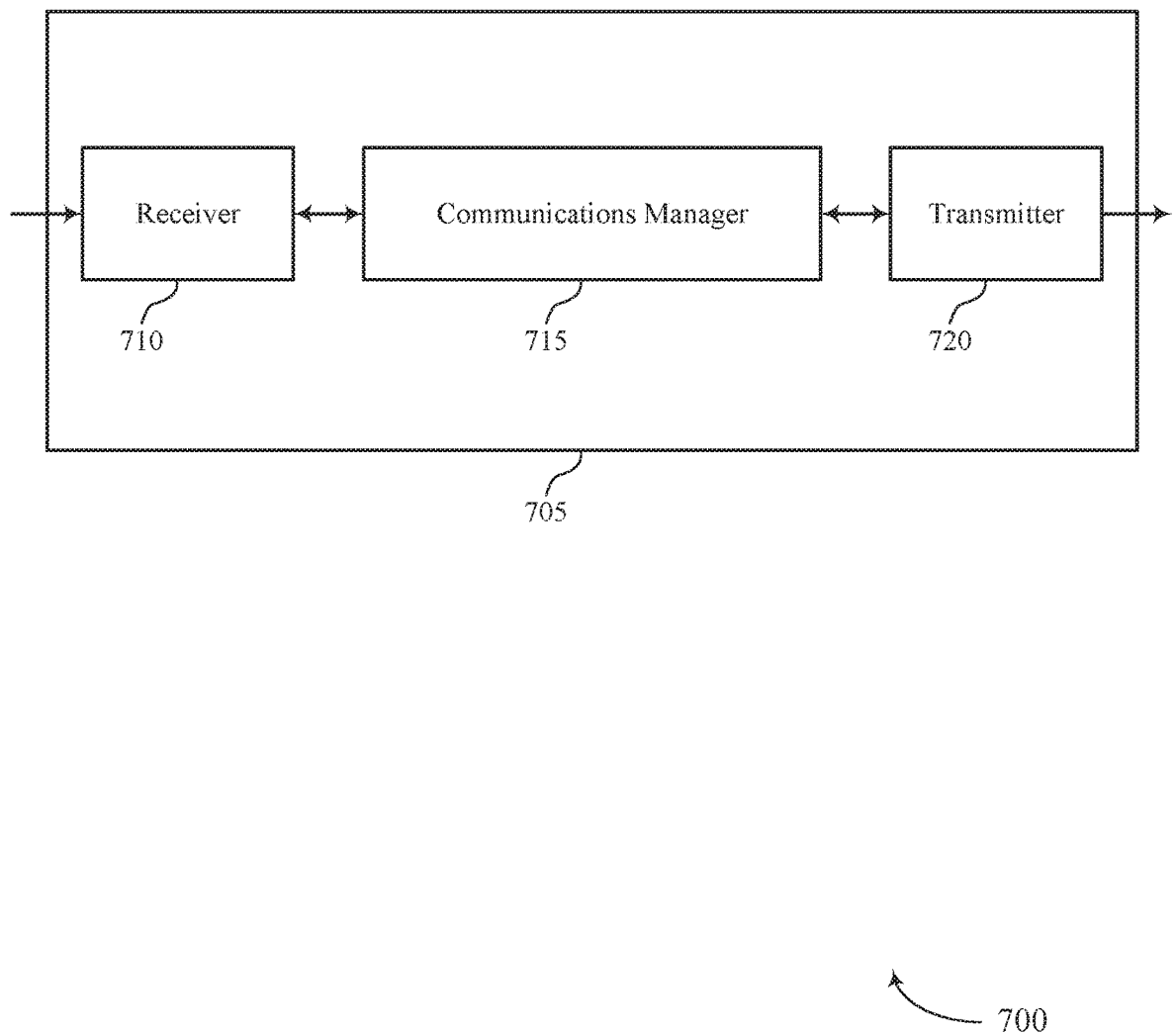
FIGS. 7 and 8 show block diagrams of devices that support uplink transmission techniques using preconfigured resources in wireless communications in accordance with aspects of the present disclosure.

FIG. 7 shows a block diagram 700 of a device 705 that supports uplink transmission techniques using preconfigured resources in wireless communications in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to uplink transmission techniques using preconfigured resources in wireless communications, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may establish a first connection with a base station, transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication, and transmit the second uplink communication using the indicated one or more physical layer parameters via the contention-based uplink resource. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
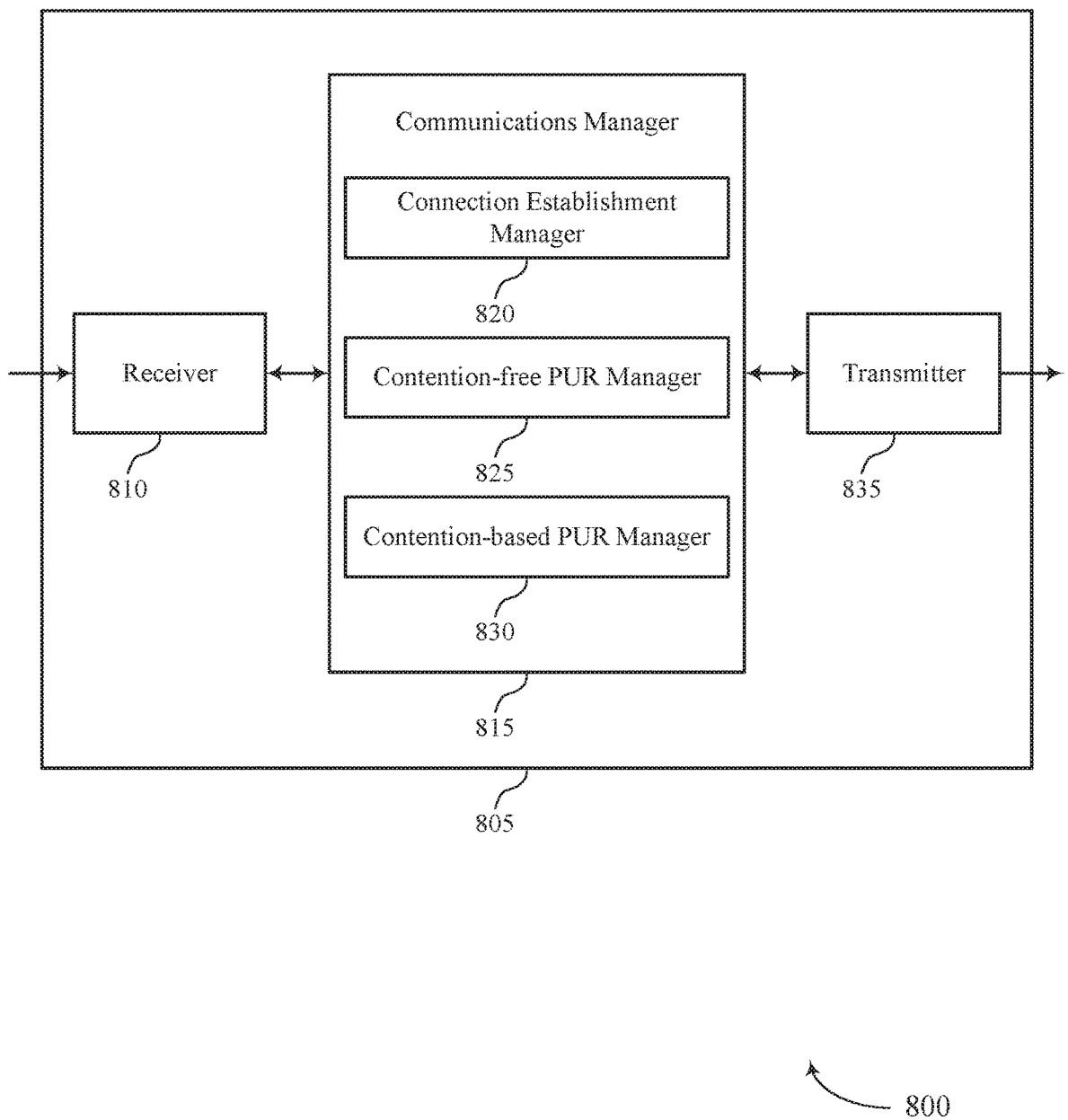

FIG. 8 shows a block diagram 800 of a device 805 that supports uplink transmission techniques using preconfigured resources in wireless communications in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to uplink transmission techniques using preconfigured resources in wireless communications, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a connection establishment manager 820, a contention-free PUR manager 825, and a contention-based PUR manager 830. The communications manager 815 may be an example of aspects of the communications manager 1010 described herein.

The connection establishment manager 820 may establish a first connection with a base station.

The contention-free PUR manager 825 may transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication.

The contention-based PUR manager 830 may transmit the second uplink communication using the indicated one or more physical layer parameters via the contention-based uplink resource.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
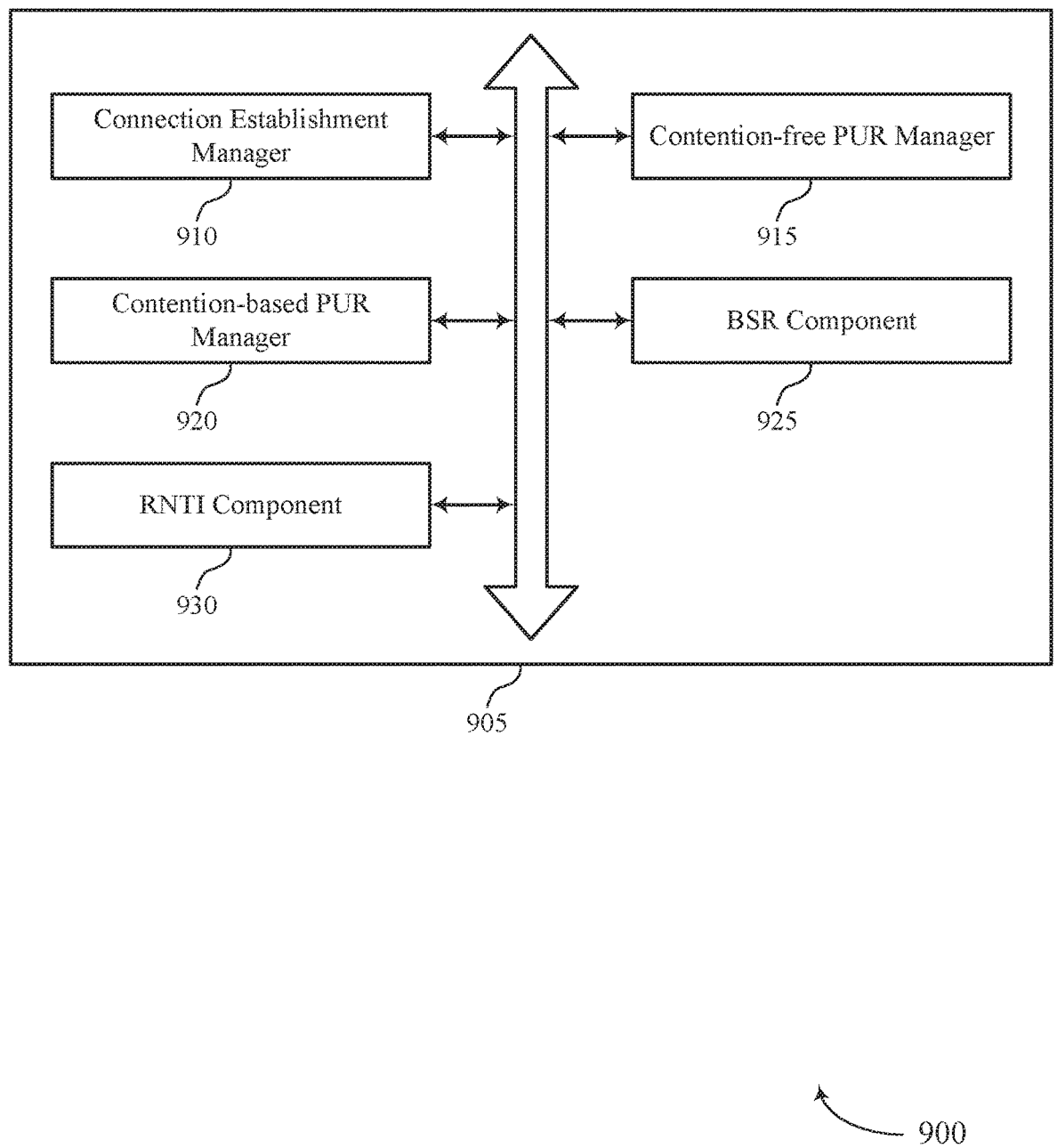
FIG. 9 shows a block diagram of a communications manager that supports uplink transmission techniques using preconfigured resources in wireless communications in accordance with aspects of the present disclosure.

FIG. 9 shows a block diagram 900 of a communications manager 905 that supports uplink transmission techniques using preconfigured resources in wireless communications in accordance with aspects of the present disclosure. The communications manager 905 may be an example of aspects of a communications manager 715, a communications manager 815, or a communications manager 1010 described herein. The communications manager 905 may include a connection establishment manager 910, a contention-free PUR manager 915, a contention-based PUR manager 920, a BSR component 925, and a RNTI component 930. Each of these modules may communicate, directly or indirectly, with one another (e.g., via one or more buses).

The connection establishment manager 910 may establish a first connection with a base station. In some examples, the connection establishment manager 910 may receive, from the base station, configuration information that provides the first set of contention-free uplink resources allocated to the UE and the second set of contention-based uplink resources. In some cases, the configuration information for the first set of contention-free uplink resources allocated to the UE includes one or more of a periodicity of the first set of contention-free uplink resources, a time domain resource allocation of the first set of contention-free uplink resources, a frequency domain resource allocation of the first set of contention-free uplink resources, a UE-specific demodulation reference signal (DMRS) configuration, a transport block size (TBS) value of the first set of contention-free uplink resources, or a repetition level of the first set of contention-free uplink resources.

In some cases, the periodic first set of time and frequency resources allocated to the UE are dedicated resources or shared resources that are shared with one or more other UEs according to an orthogonal multiplexing configuration provided with the configuration information. In some cases, the configuration information for the second set of contention-based uplink resources includes one or more of a time domain resource allocation of the second set of contention-based uplink resources, a frequency domain resource allocation of the second set of contention-based uplink resources, one or more DMRS configurations of the second set of contention-based uplink resources, a maximum TBS of the second set of contention-based uplink resources, or a maximum repetition level of the second set of contention-based uplink resources. In some cases, the second set of time and frequency resources include two or more subsets of resources, and where the indication that the UE will transmit the second uplink communication includes a selection of one subset of resources of the two or more subsets of resources for the second uplink communication.

The contention-free PUR manager 915 may transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication.

In some cases, the one or more physical layer parameters include one or more of a DMRS sequence of the second uplink communication, a MCS/TBS of the second uplink communication, a repetition level of the second uplink communication, or any combinations thereof. In some cases, the TBS and the repetition level of the second uplink communication are determined based on a maximum TBS and a maximum repetition level configured for the contention-based uplink resources, and an amount of data indicated in a BSR for the second uplink communication. In some cases, the one or more physical layer parameters are transmitted using one or more of a MAC-CE, a multiplexed data transmission on a PUSCH, or any combinations thereof.

The contention-based PUR manager 920 may transmit the second uplink communication using the indicated one or more physical layer parameters via the contention-based uplink resource. In some examples, the contention-based PUR manager 920 may monitor, during the second uplink communication, for a PDCCH transmission from the base station that includes an early termination indication. In some examples, the contention-based PUR manager 920 may discontinue the second uplink communication based on identifying the early termination indication from the base station. In some examples, the contention-based PUR manager 920 may attempt to decode the PDCCH transmission based on a RNTI associated the UE, and where the discontinuing is further based on successfully decoding the PDCCH transmission.

The BSR component 925 may generate a BSR for transmission to a base station. In some cases, the BSR may indicate an amount of data to be transmitted by the UE, and where at least a portion of the data to be transmitted by the UE is included in the second uplink communication. In some cases, the BSR indicates that the UE is to transmit the second uplink communication based on the amount of data indicated in the BSR being non-zero.

The RNTI component 930 may scramble the first and second uplink communication using a same RNTI associated with the UE. In some examples, the RNTI component 930 may scramble the first uplink communication using a CF-RNTI. In some cases, the RNTI associated with the UE is a value preconfigured at the UE by RRC signaling, or is a value determined by allocated time and frequency resources associated with the first uplink transmission.

Figure 10:
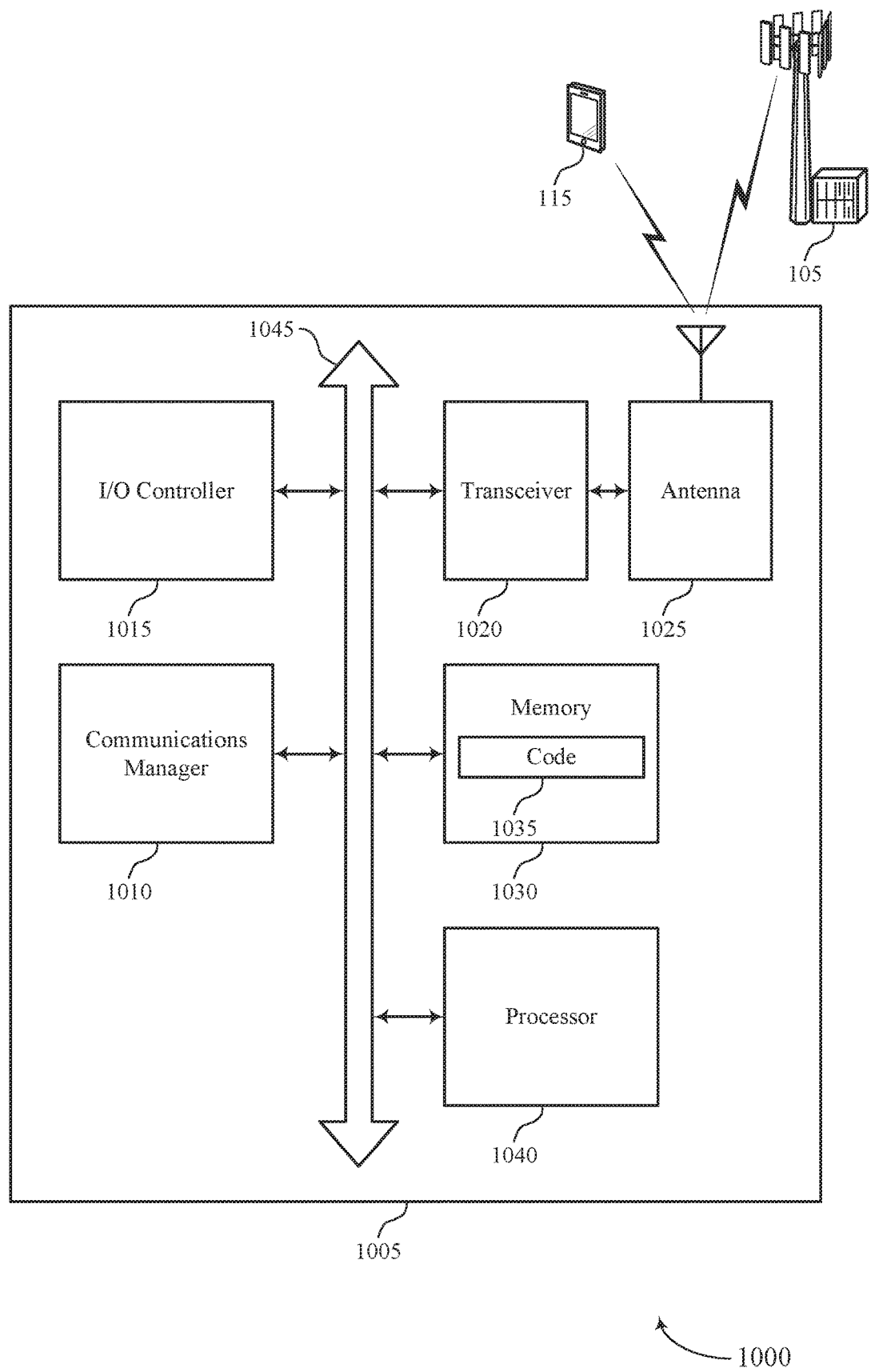
FIG. 10 shows a diagram of a system including a device that supports uplink transmission techniques using preconfigured resources in wireless communications in accordance with aspects of the present disclosure.

FIG. 10 shows a diagram of a system 1000 including a device 1005 that supports uplink transmission techniques using preconfigured resources in wireless communications in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may establish a first connection with a base station, transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication, and transmit the second uplink communication using the indicated one or more physical layer parameters via the contention-based uplink resource.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting uplink transmission techniques using preconfigured resources in wireless communications).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
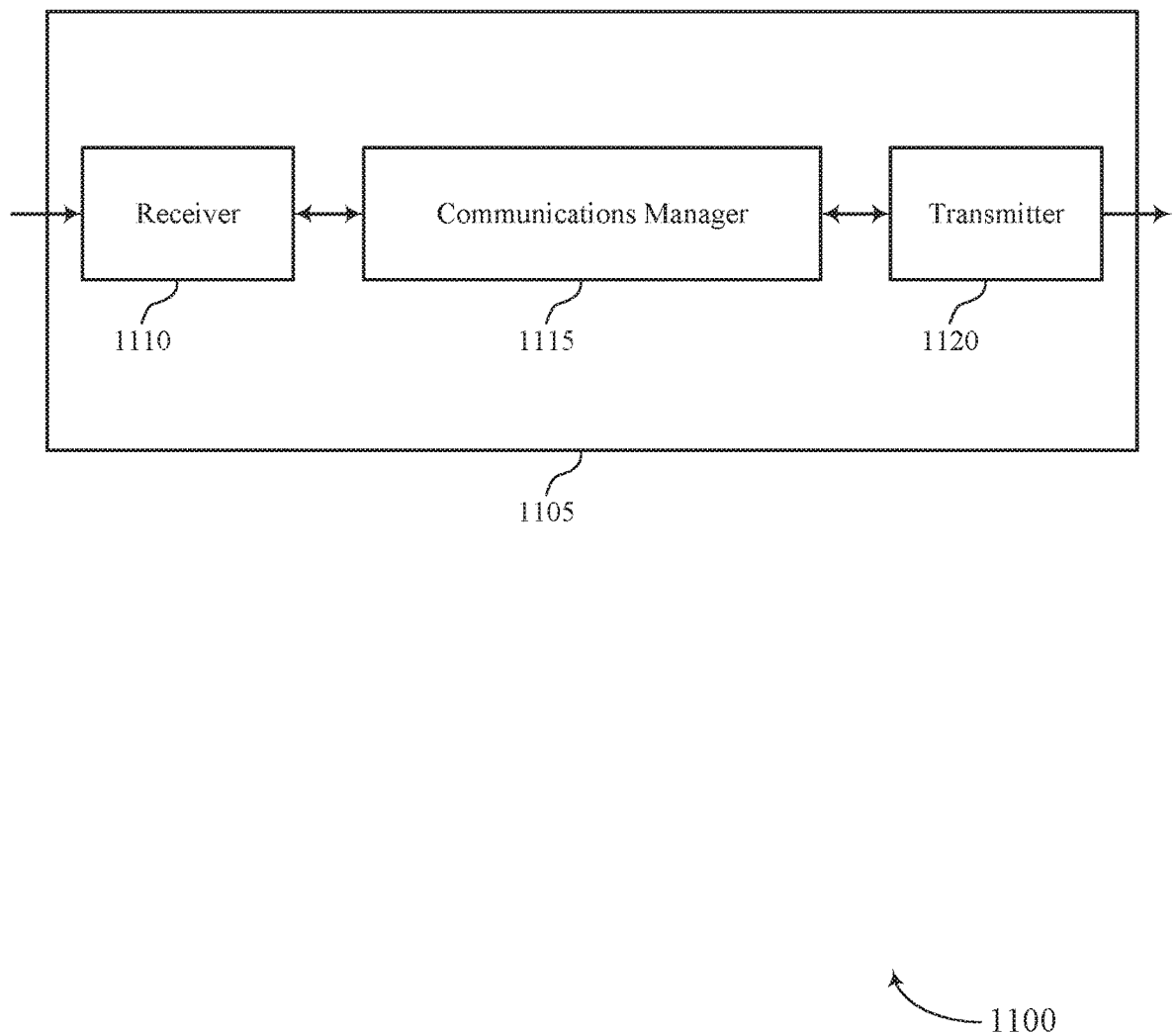
FIGS. 11 and 12 show block diagrams of devices that support uplink transmission techniques using preconfigured resources in wireless communications in accordance with aspects of the present disclosure.

FIG. 11 shows a block diagram 1100 of a device 1105 that supports uplink transmission techniques using preconfigured resources in wireless communications in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink transmission techniques using preconfigured resources in wireless communications, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may configure at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR, receive, at the base station, a first uplink communication via the first contention-free PUR, the first uplink communication including a first indication that the first UE will transmit a second uplink communication using the shared contention-based PUR, and one or more physical layer parameters associated with the second uplink communication of the first UE, and receive, at the base station via the contention-based PUR, the second uplink communication of the first UE using the one or more physical layer parameters associated with the second uplink communication of the first UE. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
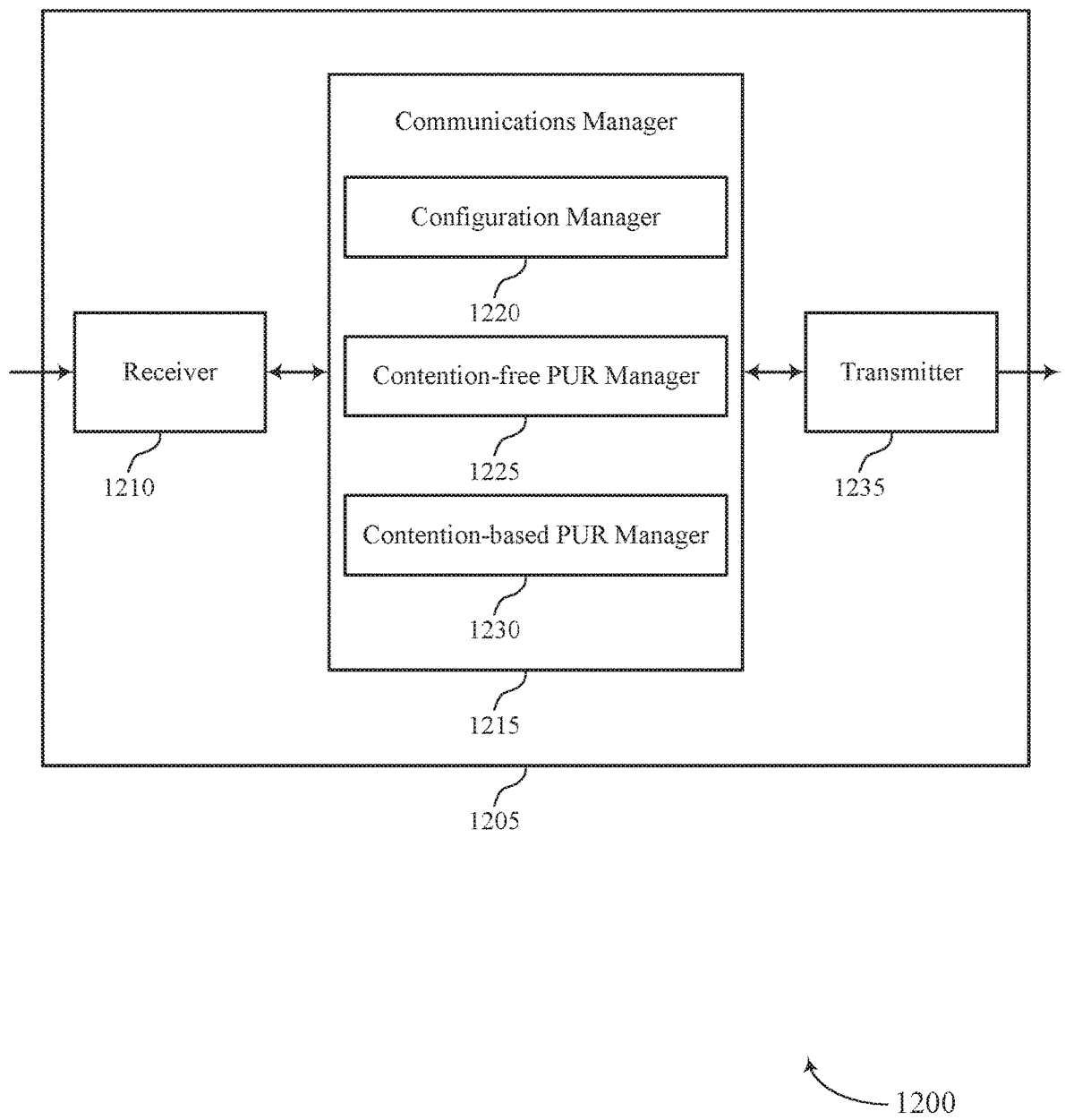

FIG. 12 shows a block diagram 1200 of a device 1205 that supports uplink transmission techniques using preconfigured resources in wireless communications in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink transmission techniques using preconfigured resources in wireless communications, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration manager 1220, a contention-free PUR manager 1225, and a contention-based PUR manager 1230. The communications manager 1215 may be an example of aspects of the communications manager 1410 described herein.

The configuration manager 1220 may configure at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR.

The contention-free PUR manager 1225 may receive a first uplink communication via the first contention-free PUR, the first uplink communication including a first indication that the first UE will transmit a second uplink communication using the shared contention-based PUR, and one or more physical layer parameters associated with the second uplink communication of the first UE.

The contention-based PUR manager 1230 may receive, via the contention-based PUR, the second uplink communication of the first UE using the one or more physical layer parameters associated with the second uplink communication of the first UE.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
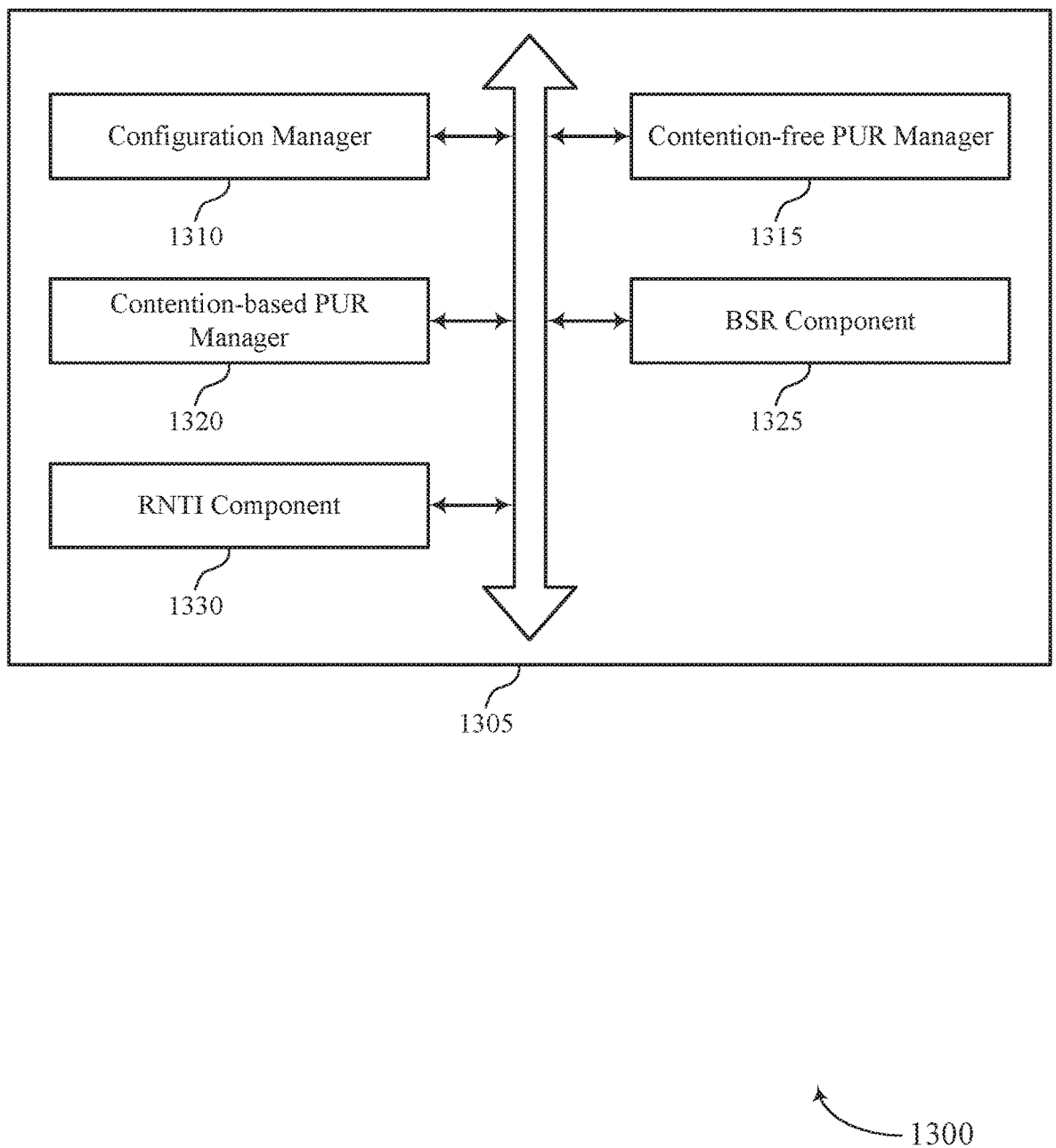
FIG. 13 shows a block diagram of a communications manager that supports uplink transmission techniques using preconfigured resources in wireless communications in accordance with aspects of the present disclosure.

FIG. 13 shows a block diagram 1300 of a communications manager 1305 that supports uplink transmission techniques using preconfigured resources in wireless communications in accordance with aspects of the present disclosure. The communications manager 1305 may be an example of aspects of a communications manager 1115, a communications manager 1215, or a communications manager 1410 described herein. The communications manager 1305 may include a configuration manager 1310, a contention-free PUR manager 1315, a contention-based PUR manager 1320, a BSR component 1325, and a RNTI component 1330. Each of these modules may communicate, directly or indirectly, with one another (e.g., via one or more buses).

The configuration manager 1310 may configure at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR. In some examples, the configuration manager 1310 may transmit, to each of the first UE and the second UE, configuration information that provides the contention-free PUR and the contention-based PUR. In some cases, the configuration information for the contention-free PUR includes one or more of a periodicity of the resource, a time domain resource allocation, a frequency domain resource allocation, a UE-specific DMRS configuration, a TBS value or a repetition level associated with the contention-free PUR. In some cases, the configuration information further includes, for the contention-based PUR, one or more of a time domain resource allocation, a frequency domain resource allocation, one or more DMRS configurations, a maximum TBS, or a maximum repetition level associated with the contention-free PUR. In some cases, the contention-based PUR include two or more subsets of resources, and where the indication that the UE will transmit the second uplink communication includes an indication of one subset of resources of the two or more subsets of resources for the second uplink communication.

The contention-free PUR manager 1315 may receive a first uplink communication via the first contention-free PUR, the first uplink communication including a first indication that the first UE will transmit a second uplink communication using the shared contention-based PUR, and one or more physical layer parameters associated with the second uplink communication of the first UE. In some cases, the one or more physical layer parameters may include a DMRS sequence of the first UE, a TBS of the second uplink communication, a repetition level of the second uplink communication of the first UE, or any combinations thereof. In some cases, the TBS and repetition level of the second uplink communication are determined based on a maximum TBS and repetition level configured for the contention-based uplink resource and the amount of data indicated in the BSR for the second uplink communication. In some cases, the one or more physical layer parameters are transmitted using one or more of a MAC-CE, a data transmission multiplexed on a PUSCH, or any combinations thereof.

The contention-based PUR manager 1320 may receive, via the contention-based PUR, the second uplink communication of the first UE using the one or more physical layer parameters associated with the second uplink communication of the first UE. In some examples, the contention-based PUR manager 1320 may receive a third uplink communication via the second contention-free PUR, the third uplink communication including a second indication that the second UE will transmit a fourth uplink communication using the contention-based PUR, and one or more physical layer parameters associated with the fourth uplink communication of the second UE. In some examples, the contention-based PUR manager 1320 may determine that the first UE and the second UE each selected a same contention-based PUR for the second uplink communication and the fourth uplink communication, the determining based on a same DMRS sequence being used for the second uplink communication and the fourth uplink communication. In some examples, the contention-based PUR manager 1320 may transmit, to the first UE, an early termination indication responsive to the determining. In some examples, the contention-based PUR manager 1320 may transmit, via a PDCCH, a first identification of the first UE that directs the first UE to discontinue the second uplink communication.

The BSR component 1325 may determine, based on a buffer size provided in the BSR being non-zero, that the first UE is to transmit the second uplink communication using the contention-based PUR. In some cases, a buffer status report (BSR) that indicates an amount of data to be transmitted by the first UE, and where at least a portion of the data to be transmitted by the first UE is included in the second uplink communication of the first UE.

The RNTI component 1330 may configure a RNTI at the UEs. In some cases, the first and second uplink communications are scrambled using a same first radio network temporary identifier (RNTI) associated with the first UE. In some cases, the first RNTI associated with the first UE is a value preconfigured by RRC signaling or a value determined based on time and frequency resources associated with the first uplink transmission.

Figure 14:
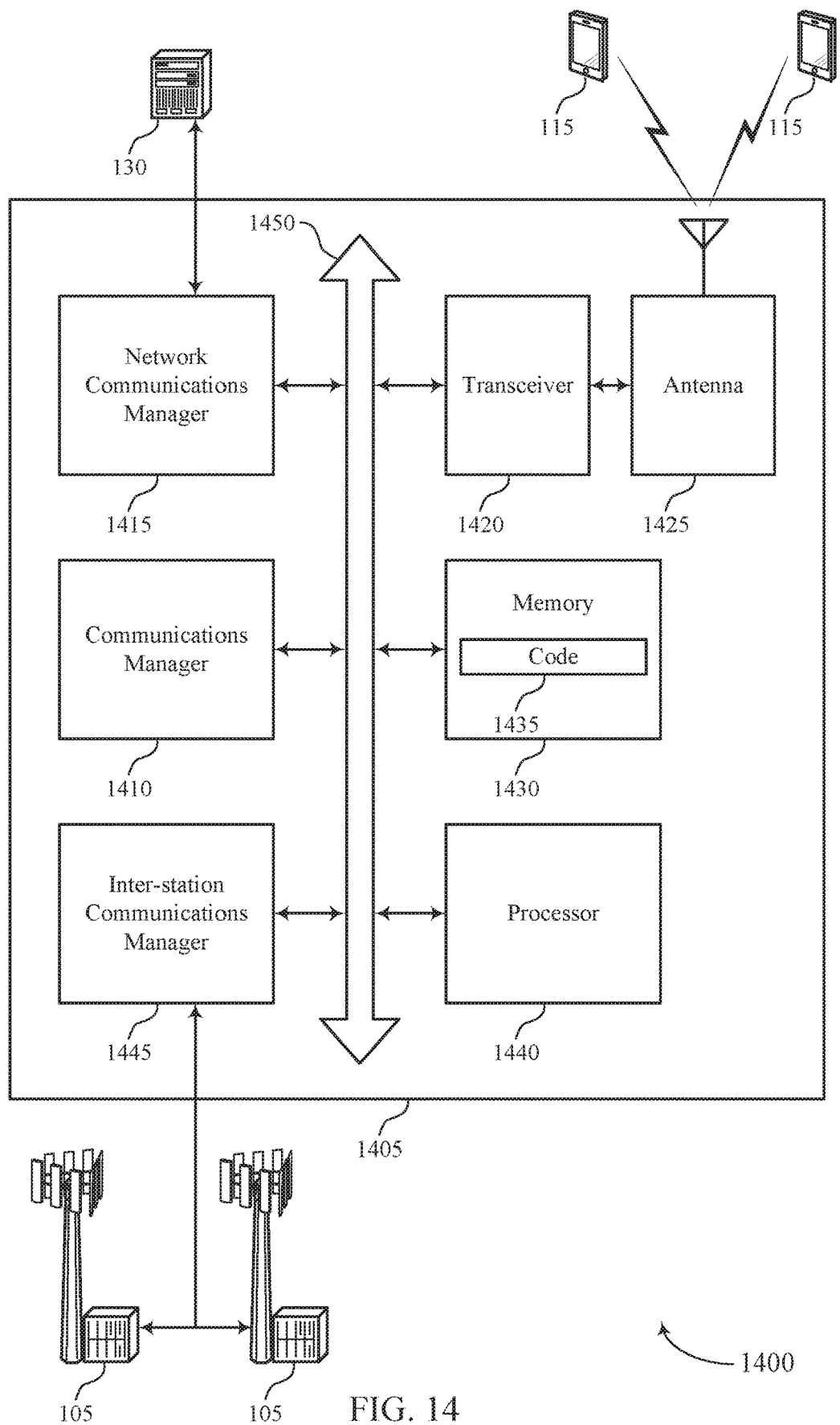
FIG. 14 shows a diagram of a system including a device that supports uplink transmission techniques using preconfigured resources in wireless communications in accordance with aspects of the present disclosure.

FIG. 14 shows a diagram of a system 1400 including a device 1405 that supports uplink transmission techniques using preconfigured resources in wireless communications in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may configure at least a first UE and a second UE with allocated contention-free preconfigured uplink resources (PUR) and contention-based PUR, where the first UE is configured with a first contention-free PUR and the second UE is configured with a second contention-free PUR that is non-overlapping with the first contention-free PUR, and where each of the first UE and the second UE have shared contention-based PUR, receive, at the base station, a first uplink communication via the first contention-free PUR, the first uplink communication including a first indication that the first UE will transmit a second uplink communication using the shared contention-based PUR, and one or more physical layer parameters associated with the second uplink communication of the first UE, and receive, at the base station via the contention-based PUR, the second uplink communication of the first UE using the one or more physical layer parameters associated with the second uplink communication of the first UE.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting uplink transmission techniques using preconfigured resources in wireless communications).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
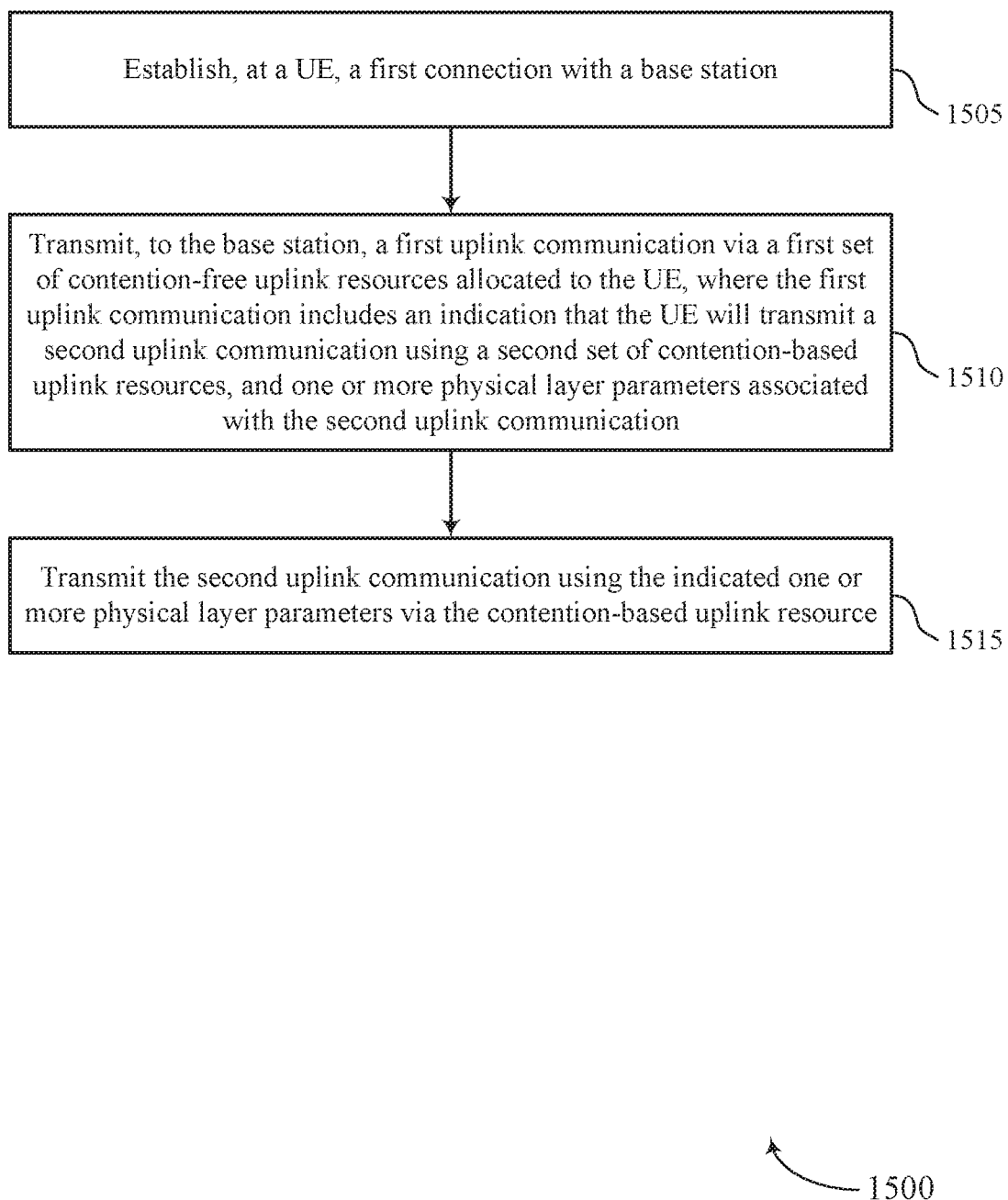
FIGS. 15 through 18 show flowcharts illustrating methods that support uplink transmission techniques using preconfigured resources in wireless communications in accordance with aspects of the present disclosure.

FIG. 15 shows a flowchart illustrating a method 1500 that supports uplink transmission techniques using preconfigured resources in wireless communications in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may establish a first connection with a base station. The operations of 1505 may be performed according to the methods described herein. In some examples, aspects of the operations of 1505 may be performed by a connection establishment manager as described with reference to FIGS. 7 through 10.

At 1510, the UE may transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication. The operations of 1510 may be performed according to the methods described herein. In some examples, aspects of the operations of 1510 may be performed by a contention-free PUR manager as described with reference to FIGS. 7 through 10. In some cases, the first uplink communication may include a BSR that indicates an amount of data to be transmitted by the UE, and where at least a portion of the data to be transmitted by the UE is included in the second uplink communication. In some cases, the first uplink communication may include a DMRS sequence of the second uplink communication. In some cases, the first uplink communication may include a TBS of the second uplink communication. In some cases, the first uplink communication may include a repetition level of the second uplink communication. In some cases, the one or more physical layer parameters are transmitted using one or more of a MAC-CE, a multiplexed data transmission on a PUSCH, or any combinations thereof.

At 1515, the UE may transmit the second uplink communication using the indicated one or more physical layer parameters via the contention-based uplink resource. The operations of 1515 may be performed according to the methods described herein. In some examples, aspects of the operations of 1515 may be performed by a contention-based PUR manager as described with reference to FIGS. 7 through 10.

Figure 16:
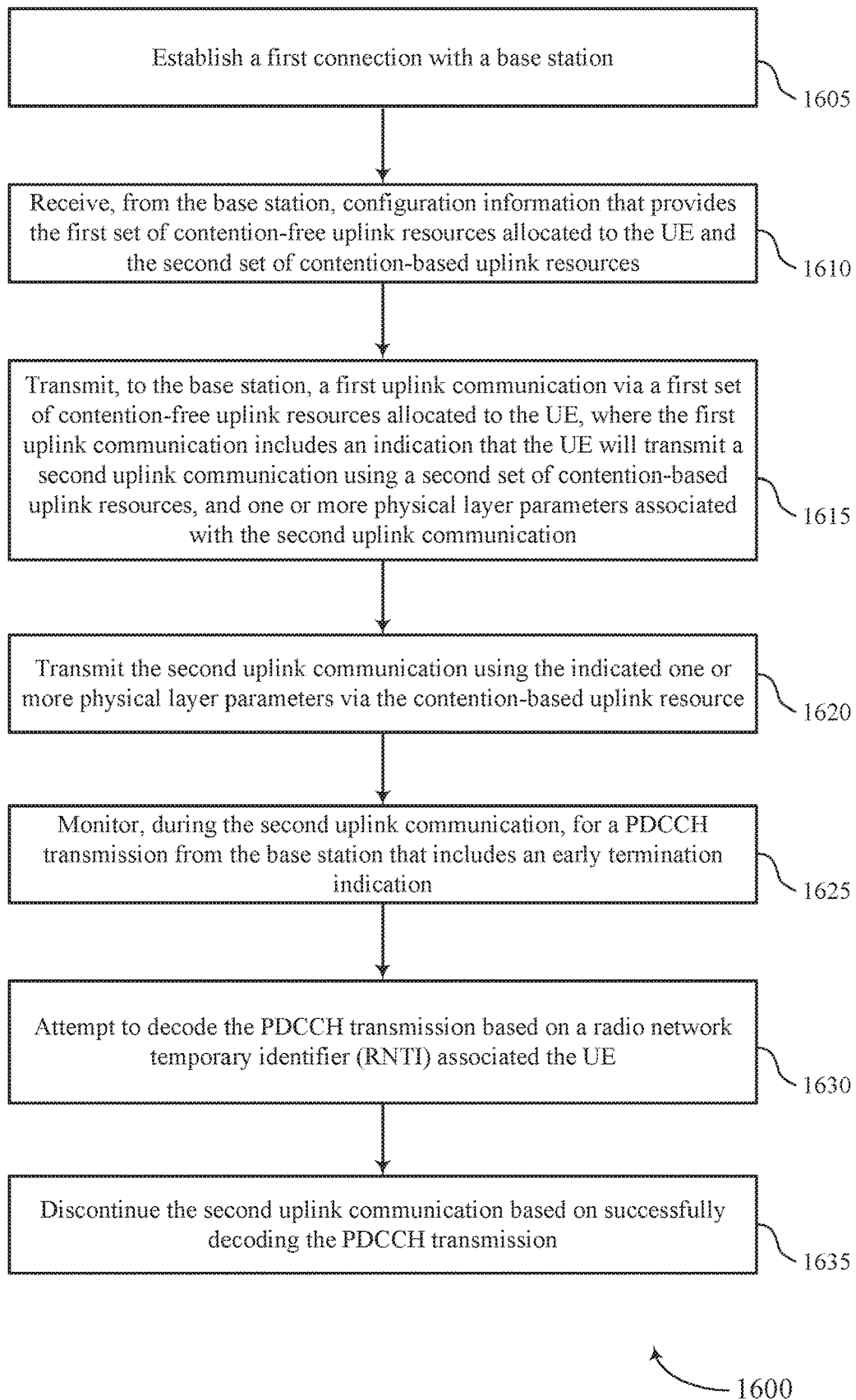

FIG. 16 shows a flowchart illustrating a method 1600 that supports uplink transmission techniques using preconfigured resources in wireless communications in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may establish a first connection with a base station. The operations of 1605 may be performed according to the methods described herein. In some examples, aspects of the operations of 1605 may be performed by a connection establishment manager as described with reference to FIGS. 7 through 10.

At 1610, the UE may receive, from the base station, configuration information that provides the first set of contention-free uplink resources allocated to the UE and the second set of contention-based uplink resources. The operations of 1610 may be performed according to the methods described herein. In some examples, aspects of the operations of 1610 may be performed by a connection establishment manager as described with reference to FIGS. 7 through 10. In some cases, the configuration information for the first set of contention-free uplink resources allocated to the UE includes one or more of a periodicity of the first set of contention-free uplink resources, a time domain resource allocation of the first set of contention-free uplink resources, a frequency domain resource allocation of the first set of contention-free uplink resources, a UE-specific DMRS configuration, a TBS value of the first set of contention-free uplink resources, or a repetition level of the first set of contention-free uplink resources.

At 1615, the UE may transmit, to the base station, a first uplink communication via a first set of contention-free uplink resources allocated to the UE, where the first uplink communication includes an indication that the UE will transmit a second uplink communication using a second set of contention-based uplink resources, and one or more physical layer parameters associated with the second uplink communication. The operations of 1615 may be performed according to the methods described herein. In some examples, aspects of the operations of 1615 may be performed by a contention-free PUR manager as described with reference to FIGS. 7 through 10.

At 1620, the UE may transmit the second uplink communication using the indicated one or more physical layer parameters via the contention-based uplink resource. The operations of 1620 may be performed according to the methods described herein. In some examples, aspects of the operations of 1620 may be performed by a contention-based PUR manager as described with reference to FIGS. 7 through 10.

At 1625, the UE may monitor, during the second uplink communication, for a PDCCH transmission from the base station that includes an early termination indication. The operations of 1625 may be performed according to the methods described herein. In some examples, aspects of the operations of 1625 may be performed by a contention-based PUR manager as described with reference to FIGS. 7 through 10.

At 1630, the UE may attempt to decode the PDCCH transmission based on a RNTI associated the UE, and where the discontinuing is further based on successfully decoding the PDCCH transmission. The operations of 1630 may be performed according to the methods described herein. In some examples, aspects of the operations of 1630 may be performed by a contention-based PUR manager as described with reference to FIGS. 7 through 10.

At 1635, the UE may discontinue the second uplink communication based on identifying the early termination indication from the base station. The operations of 1635 may be performed according to the methods described herein. In some examples, aspects of the operations of 1635 may be performed by a contention-based PUR manager as described with reference to FIGS. 7 through 10.

Figure 17:
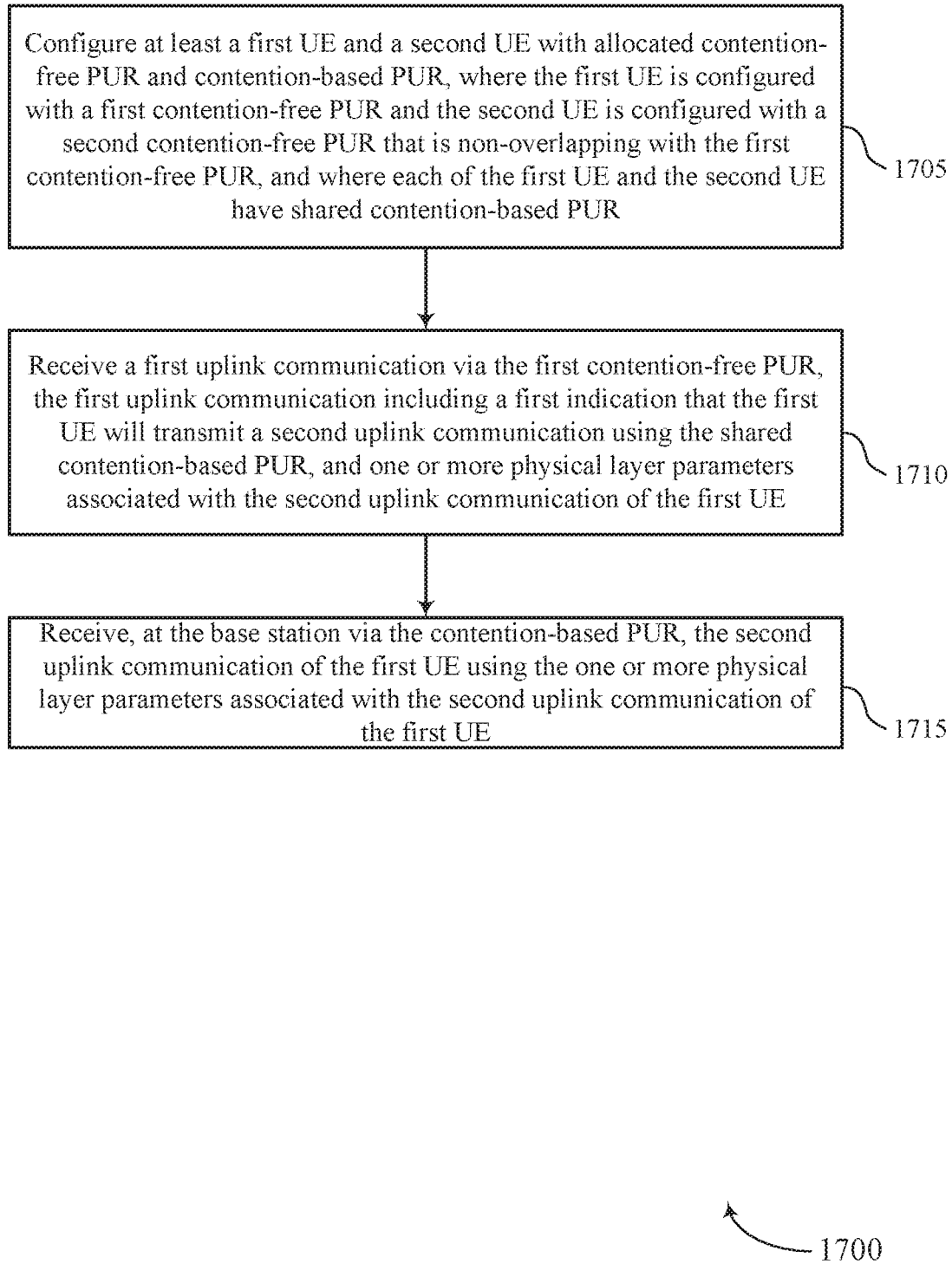

FIG. 17 shows a flowchart illustrating a method 1700 that supports uplink transmission techniques using preconfigured resources in wireless communications in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may configure at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR. The operations of 1705 may be performed according to the methods described herein. In some examples, aspects of the operations of 1705 may be performed by a configuration manager as described with reference to FIGS. 11 through 14.

At 1710, the base station may receive a first uplink communication via the first contention-free PUR, the first uplink communication including a first indication that the first UE will transmit a second uplink communication using the shared contention-based PUR, and one or more physical layer parameters associated with the second uplink communication of the first UE. The operations of 1710 may be performed according to the methods described herein. In some examples, aspects of the operations of 1710 may be performed by a contention-free PUR manager as described with reference to FIGS. 11 through 14. In some cases, one or more physical layer parameters may include a BSR that indicates an amount of data to be transmitted by the first UE, and where at least a portion of the data to be transmitted by the first UE is included in the second uplink communication of the first UE. In some cases, the one or more physical layer parameters may include a DMRS sequence of the first UE, a TBS of the second uplink communication, a repetition level of the second uplink communication of the first UE, or any combinations thereof.

At 1715, the base station may receive, via the contention-based PUR, the second uplink communication of the first UE using the one or more physical layer parameters associated with the second uplink communication of the first UE. The operations of 1715 may be performed according to the methods described herein. In some examples, aspects of the operations of 1715 may be performed by a contention-based PUR manager as described with reference to FIGS. 11 through 14.

Figure 18:
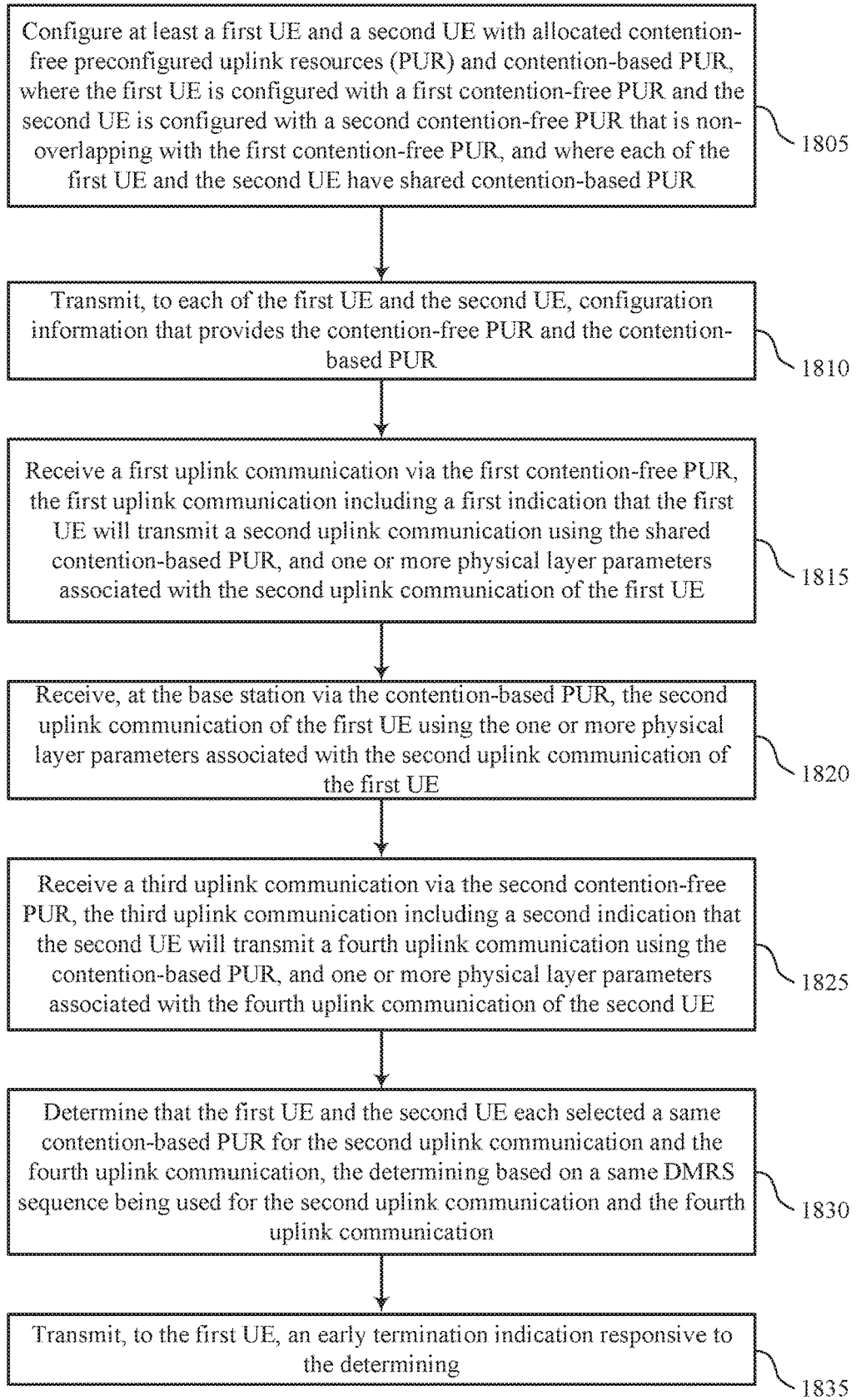

FIG. 18 shows a flowchart illustrating a method 1800 that supports uplink transmission techniques using preconfigured resources in wireless communications in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may configure at least a first UE and a second UE with allocated contention-free PUR and contention-based PUR, where the first UE is configured with a first contention-free PUR and the second UE is configured with a second contention-free PUR that is non-overlapping with the first contention-free PUR, and where each of the first UE and the second UE have shared contention-based PUR. The operations of 1805 may be performed according to the methods described herein. In some examples, aspects of the operations of 1805 may be performed by a configuration manager as described with reference to FIGS. 11 through 14.

At 1810, the base station may transmit, to each of the first UE and the second UE, configuration information that provides the contention-free PUR and the contention-based PUR. The operations of 1810 may be performed according to the methods described herein. In some examples, aspects of the operations of 1810 may be performed by a configuration manager as described with reference to FIGS. 11 through 14.

At 1815, the base station may receive a first uplink communication via the first contention-free PUR, the first uplink communication including a first indication that the first UE will transmit a second uplink communication using the shared contention-based PUR, and one or more physical layer parameters associated with the second uplink communication of the first UE. The operations of 1815 may be performed according to the methods described herein. In some examples, aspects of the operations of 1815 may be performed by a contention-free PUR manager as described with reference to FIGS. 11 through 14.

At 1820, the base station may receive, via the contention-based PUR, the second uplink communication of the first UE using the one or more physical layer parameters associated with the second uplink communication of the first UE. The operations of 1820 may be performed according to the methods described herein. In some examples, aspects of the operations of 1820 may be performed by a contention-based PUR manager as described with reference to FIGS. 11 through 14.

At 1825, the base station may receive a third uplink communication via the second contention-free PUR, the third uplink communication including a second indication that the second UE will transmit a fourth uplink communication using the contention-based PUR, and one or more physical layer parameters associated with the fourth uplink communication of the second UE. The operations of 1825 may be performed according to the methods described herein. In some examples, aspects of the operations of 1825 may be performed by a contention-based PUR manager as described with reference to FIGS. 11 through 14.

At 1830, the base station may determine that the first UE and the second UE each selected a same contention-based PUR for the second uplink communication and the fourth uplink communication, the determining based on a same demodulation reference signal (DMRS) sequence being used for the second uplink communication and the fourth uplink communication. The operations of 1830 may be performed according to the methods described herein. In some examples, aspects of the operations of 1830 may be performed by a contention-based PUR manager as described with reference to FIGS. 11 through 14.

At 1835, the base station may transmit, to the first UE, an early termination indication responsive to the determining. The operations of 1835 may be performed according to the methods described herein. In some examples, aspects of the operations of 1835 may be performed by a contention-based PUR manager as described with reference to FIGS. 11 through 14. In some cases, the base station may transmit, via a PDCCH, a first identification of the first UE that directs the first UE to discontinue the second uplink communication.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing, at a user equipment (UE), a first connection with a network entity;
   transmitting, to the network entity, a first uplink communication via a first set of contention-free preconfigured uplink resources allocated to the UE, wherein the first uplink communication comprises an indication that the UE will transmit a second uplink communication using a second set of contention-based preconfigured uplink resources, and one or more physical layer parameters associated with the second uplink communication; and
   transmitting the second uplink communication using the one or more physical layer parameters indicated in the first uplink communication, the second uplink communication transmitted via the contention-based preconfigured uplink resources.

2. The method of claim 1, wherein the indication that the UE will transmit the second uplink communication comprises a buffer status report (BSR) that indicates an amount of data to be transmitted by the UE, and wherein at least a portion of the data to be transmitted by the UE is included in the second uplink communication.

3. The method of claim 2, wherein the BSR indicates that the UE is to transmit the second uplink communication based on the amount of data indicated in the BSR being non-zero.

4. The method of claim 1, wherein the one or more physical layer parameters associated with the second uplink communication include one or more of:
   a demodulation reference signal (DMRS) sequence of the second uplink communication;
   a transport block size (TBS) of the second uplink communication;
   a repetition level of the second uplink communication; or
   any combinations thereof.

5. The method of claim 4, wherein the TBS and the repetition level of the second uplink communication are determined based at least in part on a maximum TBS and a maximum repetition level configured for the contention-based preconfigured uplink resources, and an amount of data indicated in a buffer status report (BSR) for the second uplink communication.

6. The method of claim 4, wherein the one or more physical layer parameters are transmitted using one or more of a medium access control (MAC) control element (MAC-CE), a multiplexed data transmission on a physical uplink shared channel (PUSCH), or any combinations thereof.

7. The method of claim 1, wherein the transmitting the first and second uplink communication further comprises:
   scrambling the first and second uplink communication using a same radio network temporary identifier (RNTI) associated with the UE.

8. The method of claim 7, wherein the RNTI associated with the UE is a value preconfigured to the UE by radio resource control (RRC) signaling, or is a value determined by allocated time and frequency resources associated with the first uplink communication.

9. The method of claim 1, further comprising:
   monitoring, during the second uplink communication, for a physical downlink control channel (PDCCH) transmission from the network entity that includes an early termination indication; and
   discontinuing the second uplink communication based at least in part on identifying the early termination indication from the network entity.

10. The method of claim 9, wherein the monitoring comprises:
    attempting to decode the PDCCH transmission based at least in part on a radio network temporary identifier (RNTI) associated with the UE, and wherein the discontinuing is further based at least in part on successfully decoding the PDCCH transmission.

11. The method of claim 1, further comprising:
    receiving, from the network entity, configuration information that provides the first set of contention-free preconfigured uplink resources allocated to the UE and the second set of contention-based preconfigured uplink resources.

12. The method of claim 11, wherein the configuration information for the first set of contention-free preconfigured uplink resources allocated to the UE comprises one or more of a periodicity of the first set of contention-free preconfigured uplink resources, a time domain resource allocation of the first set of contention-free preconfigured uplink resources, a frequency domain resource allocation of the first set of contention-free preconfigured uplink resources, a UE-specific demodulation reference signal (DMRS) configuration, a transport block size (TBS) value of the first set of contention-free preconfigured uplink resources, or a repetition level of the first set of contention-free preconfigured uplink resources.

13. The method of claim 12, wherein the periodic first set of time and frequency resources allocated to the UE are dedicated resources or shared resources that are shared with one or more other UEs according to an orthogonal multiplexing configuration provided with the configuration information.

14. The method of claim 12, wherein the configuration information for the second set of contention-based preconfigured uplink resources comprises one or more of a time domain resource allocation of the second set of contention-based preconfigured uplink resources, a frequency domain resource allocation of the second set of contention-based preconfigured uplink resources, one or more DMRS configurations of the second set of contention-based preconfigured uplink resources, a maximum TBS of the second set of contention-based preconfigured uplink resources, or a maximum repetition level of the second set of contention-based preconfigured uplink resources.

15. The method of claim 14, wherein the second set of time and frequency resources comprise two or more subsets of resources, and wherein the indication that the UE will transmit the second uplink communication comprises a selection of one subset of resources of the two or more subsets of resources for the second uplink communication.

16. A method for wireless communication, comprising:
configuring, by a network entity, at least a first user equipment (UE) and a second UE with allocated contention-free preconfigured uplink resources (PUR) and contention-based PUR, wherein the first UE is configured with a first contention-free PUR and the second UE is configured with a second contention-free PUR that is non-overlapping with the first contention-free PUR, and wherein each of the first UE and the second UE have shared contention-based PUR;
receiving, at the network entity, a first uplink communication via the first contention-free PUR, the first uplink communication comprising a first indication that the first UE will transmit a second uplink communication using the shared contention-based PUR, and one or more physical layer parameters associated with the second uplink communication of the first UE; and
receiving, at the network entity the contention-based PUR, the second uplink communication of the first UE using the one or more physical layer parameters indicated in the first uplink communication.

17. The method of claim 16, wherein the first indication comprises a buffer status report (BSR) that indicates an amount of data to be transmitted by the first UE, and wherein at least a portion of the data to be transmitted by the first UE is included in the second uplink communication of the first UE.

18. The method of claim 17, further comprising:
determining, based at least in part on a buffer size provided in the BSR being non-zero, that the first UE is to transmit the second uplink communication using the contention-based PUR.

19. The method of claim 16, wherein the one or more physical layer parameters associated with the second uplink communication of the first UE include one or more of:
a demodulation reference signal (DMRS) sequence of the first UE;
a transport block size (TBS) of the second uplink communication;
a repetition level of the second uplink communication of the first UE; or
any combinations thereof.

20. The method of claim 19, wherein the TBS and repetition level of the second uplink communication are determined based on a maximum TBS and repetition level configured for the contention-based PUR and an amount of data indicated in a buffer status report for the second uplink communication.

21. The method of claim 19, wherein the one or more physical layer parameters are transmitted using one or more of a medium access control (MAC) control element (MAC-CE), a data transmission multiplexed on a physical uplink shared channel (PUSCH), or any combinations thereof.

22. The method of claim 16, wherein the first and second uplink communications are scrambled using a same first radio network temporary identifier (RNTI) associated with the first UE.

23. The method of claim 22, wherein the first RNTI associated with the first UE is a value preconfigured by radio resource control (RRC) signaling or a value determined based at least in part on time and frequency resources associated with the first uplink communication.

24. The method of claim 16, further comprising:
receiving a third uplink communication via the second contention-free PUR, the third uplink communication comprising a second indication that the second UE will transmit a fourth uplink communication using the contention-based PUR, and one or more physical layer parameters associated with the fourth uplink communication of the second UE;
determining that the first UE and the second UE each selected a same contention-based PUR for the second uplink communication and the fourth uplink communication, the determining based at least in part on a same demodulation reference signal (DMRS) sequence being used for the second uplink communication and the fourth uplink communication; and
transmitting, to the first UE, an early termination indication responsive to the determining.

25. The method of claim 24, wherein the transmitting the early termination indication comprises:
transmitting, via a physical downlink control channel (PDCCH), a first identification of the first UE that directs the first UE to discontinue the second uplink communication.

26. The method of claim 16, wherein the configuring further comprises:
transmitting, to each of the first UE and the second UE, configuration information that provides the contention-free PUR and the contention-based PUR.

27. The method of claim 26, wherein the configuration information for the contention-free PUR comprises one or more of a periodicity of the contention-free PUR, a time domain resource allocation, a frequency domain resource allocation, a UE-specific demodulation reference signal (DMRS) configuration, a transport block size (TBS) value or a repetition level associated with the contention-free PUR.

28. The method of claim 27, wherein the configuration information further comprises, for the contention-based PUR, one or more of a time domain resource allocation, a frequency domain resource allocation, one or more DMRS configurations, a maximum TBS, or a maximum repetition level associated with the contention-free PUR.

29. The method of claim 28, wherein the contention-based PUR include two or more subsets of resources, and wherein the indication that the UE will transmit the second uplink communication comprises an indication of one subset of resources of the two or more subsets of resources for the second uplink communication.

30. An apparatus for wireless communication, comprising:
a processor,
memory in electronic communication with the processor; and
instructions stored in the memory and executable by the processor to cause the apparatus to:
establish, at a user equipment (UE), a first connection with a network entity;
transmit, to the network entity, a first uplink communication via a first set of contention-free preconfigured uplink resources allocated to the UE, wherein the first uplink communication comprises an indication that the UE will transmit a second uplink communication using a second set of contention-based preconfigured uplink resources, and one or more physical layer parameters associated with the second uplink communication; and
transmit the second uplink communication using the one or more physical layer parameters indicated in the first uplink communication, the second uplink communication transmitted via the contention-based preconfigured uplink resources.

31. An apparatus for wireless communication, comprising:
a processor,
memory in electronic communication with the processor; and
instructions stored in the memory and executable by the processor to cause the apparatus to:
configure, by a network entity, at least a first user equipment (UE) and a second UE with allocated contention-free preconfigured uplink resources (PUR) and contention-based PUR, wherein the first UE is configured with a first contention-free PUR and the second UE is configured with a second contention-free PUR that is non-overlapping with the first contention-free PUR, and wherein each of the first UE and the second UE have shared contention-based PUR;
receive, at the network entity, a first uplink communication via the first contention-free PUR, the first uplink communication comprising a first indication that the first UE will transmit a second uplink communication using the shared contention-based PUR, and one or more physical layer parameters associated with the second uplink communication of the first UE; and
receive, at the network entity via the contention-based PUR, the second uplink communication of the first UE using the one or more physical layer parameters indicated in the first uplink communication.

32. An apparatus for wireless communication, comprising:
means for establishing, at a user equipment (UE), a first connection with a network entity;
means for transmitting, to the network entity, a first uplink communication via a first set of contention-free preconfigured uplink resources allocated to the UE, wherein the first uplink communication comprises an indication that the UE will transmit a second uplink communication using a second set of contention-based preconfigured uplink resources, and one or more physical layer parameters associated with the second uplink communication; and
means for transmitting the second uplink communication using the one or more physical layer parameters indicated in the first uplink communication, the second uplink communication transmitted via the contention-based preconfigured uplink resources.

33. An apparatus for wireless communication, comprising:
means for configuring, by a network entity, at least a first user equipment (UE) and a second UE with allocated contention-free preconfigured uplink resources (PUR) and contention-based PUR, wherein the first UE is configured with a first contention-free PUR and the second UE is configured with a second contention-free PUR that is non-overlapping with the first contention-free PUR, and wherein each of the first UE and the second UE have shared contention-based PUR;
means for receiving, at the network entity, a first uplink communication via the first contention-free PUR, the first uplink communication comprising a first indication that the first UE will transmit a second uplink communication using the shared contention-based PUR, and one or more physical layer parameters associated with the second uplink communication of the first UE; and
means for receiving, at the network entity via the contention-based PUR, the second uplink communication of the first UE using the one or more physical layer parameters indicated in the first uplink communication.

34. A non-transitory computer-readable medium storing code for wireless communication, the code comprising instructions executable by a processor to:
establish, at a user equipment (UE), a first connection with a network entity;
transmit, to the network entity, a first uplink communication via a first set of contention-free preconfigured uplink resources allocated to the UE, wherein the first uplink communication comprises an indication that the UE will transmit a second uplink communication using a second set of contention-based preconfigured uplink resources, and one or more physical layer parameters associated with the second uplink communication; and
transmit the second uplink communication using the one or more physical layer parameters indicated in the first uplink communication, the second uplink communication transmitted via the contention-based preconfigured uplink resources.

35. A non-transitory computer-readable medium storing code for wireless communication, the code comprising instructions executable by a processor to:
configure, by a network entity, at least a first user equipment (UE) and a second UE with allocated contention-free preconfigured uplink resources (PUR) and contention-based PUR, wherein the first UE is configured with a first contention-free PUR and the second UE is configured with a second contention-free PUR that is non-overlapping with the first contention-free PUR, and wherein each of the first UE and the second UE have shared contention-based PUR;
receive, at the network entity, a first uplink communication via the first contention-free PUR, the first uplink communication comprising a first indication that the first UE will transmit a second uplink communication using the shared contention-based PUR, and one or more physical layer parameters associated with the second uplink communication of the first UE; and receive, at the network entity via the contention-based PUR, the second uplink communication of the first UE using the one or more physical layer parameters indicated in the first uplink communication.

* * * * *